(12) United States Patent
Park

(10) Patent No.: US 11,295,195 B2
(45) Date of Patent: Apr. 5, 2022

(54) NEURAL NETWORK DEVICES AND METHODS OF OPERATING THE SAME

(71) Applicant: Samsung Electronics Co., Ltd., Suwon-si (KR)

(72) Inventor: Jun-seok Park, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1065 days.

(21) Appl. No.: 15/864,379

(22) Filed: Jan. 8, 2018

(65) Prior Publication Data

US 2018/0253635 A1    Sep. 6, 2018

(30) Foreign Application Priority Data

Mar. 3, 2017    (KR) .......................... 10-2017-0027778

(51) Int. Cl.
| | |
|---|---|
| *G06N 3/02* | (2006.01) |
| *G06F 7/535* | (2006.01) |
| *G06F 7/523* | (2006.01) |
| *G06F 7/544* | (2006.01) |
| *G06N 3/04* | (2006.01) |
| *G06N 3/063* | (2006.01) |

(52) U.S. Cl.
CPC .............. *G06N 3/02* (2013.01); *G06F 7/523* (2013.01); *G06F 7/535* (2013.01); *G06F 7/5443* (2013.01); *G06N 3/0454* (2013.01); *G06F 2207/4824* (2013.01); *G06N 3/063* (2013.01)

(58) Field of Classification Search
CPC ........ G06N 3/02; G06N 3/0454; G06N 3/063; G06N 3/04; G06F 7/5443; G06F 7/535; G06F 7/523; G06F 2207/4824

USPC .......................................................... 706/25
See application file for complete search history.

(56) References Cited

U.S. PATENT DOCUMENTS

| | | | |
|---|---|---|---|
| 6,301,381 B1 | 10/2001 | Hayashi | |
| 6,516,309 B1 | 2/2003 | Eberhart et al. | |
| 7,305,370 B2 | 12/2007 | Pok et al. | |
| 7,634,137 B2 | 12/2009 | Simard et al. | |
| 7,756,845 B2 * | 7/2010 | Madani .................. | G06N 20/00 707/696 |

(Continued)

FOREIGN PATENT DOCUMENTS

| | | |
|---|---|---|
| CN | 104809426 A | 7/2015 |
| CN | 105488515 A | 4/2016 |

(Continued)

OTHER PUBLICATIONS

Taiwanese Office Action dated Sep. 29, 2021 for corresponding Taiwanese Application No. 107107109.

*Primary Examiner* — David R Vincent
(74) *Attorney, Agent, or Firm* — Harness, Dickey & Pierce, P.L.C.

(57) ABSTRACT

A neural network device may generate an input feature list based on an input feature map, where the input feature list includes an input feature index and an input feature value, generating an output feature index based on the input feature index corresponding to an input feature included in the input feature list and a weight index corresponding to a weight included in a weight list, and generating an output feature value corresponding to the output feature index based on the input feature value corresponding to the input feature and a weight value corresponding to the weight.

17 Claims, 26 Drawing Sheets

(56) References Cited

U.S. PATENT DOCUMENTS

| | | | |
|---|---|---|---|
| 9,053,558 B2 | 6/2015 | Shen | |
| 9,449,271 B2* | 9/2016 | Wang | G06F 16/353 |
| 10,366,337 B2* | 7/2019 | Kephart | G06N 7/005 |
| 2015/0286925 A1 | 10/2015 | Levin et al. | |
| 2016/0092764 A1 | 3/2016 | Burchard | |
| 2016/0174902 A1 | 6/2016 | Georgescu et al. | |
| 2016/0180151 A1 | 6/2016 | Philbin et al. | |
| 2016/0321539 A1 | 11/2016 | Rivera et al. | |
| 2016/0322042 A1 | 11/2016 | Vlietinck et al. | |
| 2018/0089562 A1* | 3/2018 | Jin | G06F 17/18 |
| 2018/0101957 A1* | 4/2018 | Talathi | G06T 7/10 |
| 2018/0181858 A1* | 6/2018 | Son | G06N 3/0454 |
| 2018/0247180 A1* | 8/2018 | Cheng | G06F 17/16 |
| 2020/0334537 A1* | 10/2020 | Yao | G06K 9/6202 |

FOREIGN PATENT DOCUMENTS

| | | | | |
|---|---|---|---|---|
| JP | 3246764 B2 | | 1/2002 | |
| KR | 20160143548 A | * | 12/2016 | G06N 3/0454 |
| KR | 20180073118 A | * | 7/2018 | G06N 3/08 |
| TW | 201706918 A | | 2/2017 | |
| WO | WO-2018073975 A1 | * | 4/2018 | G06N 3/0454 |

* cited by examiner

FIG. 13A

<OUTPUT FEATURE MATRIX WITH STRIDE 1>

FIG. 13B

<OUTPUT FEATURE MATRIX WITH STRIDE 3>

NEURAL NETWORK DEVICES AND METHODS OF OPERATING THE SAME

CROSS-REFERENCE TO RELATED APPLICATIONS

This application claims the benefit, under 35 U.S.C. § 119, of Korean Patent Application No. 10-2017-0027778, filed on Mar. 3, 2017, in the Korean Intellectual Property Office, the disclosure of which is incorporated herein in its entirety by reference.

BACKGROUND

The inventive concepts relate to semiconductor devices, and more particularly, to neural network device configured to perform operations based on one or more indexes and one or more methods of operating the same.

A neural network refers to a computational architecture which is a model of a biological brain. As neural network technology has recently been developed, there has been a lot of research into analyzing input data and extracting valid information using neural network devices in various types of electronic systems.

Neural network devices may perform a relatively large quantity of operations ("neural network operations") with regard to complex input data. Efficient processing of neural network operations is desired for a neural network device to analyze high-definition input and extract information in real time.

The inventive concepts provide a neural network device for increasing an operating speed and reducing power consumption and a method of operating the same.

According to some example embodiments, a method of operating a neural network device may include generating an input feature list based on an input feature map, the input feature list including an input feature index and an input feature value, the input feature index and the input feature corresponding to an input feature; generating an output feature index based on a first operation on the input feature index and a weight index of a weight list; and generating an output feature value corresponding to the output feature index based on a second operation on the input feature value and a weight value corresponding to the weight index.

According to another some example embodiments, a method of operating a neural network device may include generating an input feature list, the input feature list including an input feature index and an input feature value corresponding to an input feature having a non-zero value, the input feature index indicating a location of the input feature on an input feature map; generating an output feature index based on an index operation on the input feature index; and generating an output feature value corresponding to the output feature index based on a data operation on the input feature value.

According to some example embodiments, a neural network device may include a first memory storing a program of instructions; and a processor. The processor may be configured to execute the program of instructions to perform an index operation based on an input feature index, the input feature index indicating a location of an input feature on an input feature map, generate an output feature index based on an index operation result of the index operation, perform a data operation based on an input feature value of the input feature, and generate an output feature value corresponding to the output feature index based on a data operation result of the data operation.

According to some example embodiments, a method may include generating, using an index remapper of a processor, an input feature list based on an input feature map, the input feature list including an input feature index and an input feature value, the input feature index and the input feature value corresponding to an input feature; and causing an index remapper to perform a first operation to generate an output feature index. The first operation may include adding the input feature index and a weight index of a weight list, dividing an added-up value resulting from the adding by an integer, and selecting a quotient of the dividing as an output feature index based on a determination that no remainder is present upon completion of the dividing.

BRIEF DESCRIPTION OF THE DRAWINGS

Example embodiments of the inventive concepts will be more clearly understood from the following detailed description taken in conjunction with the accompanying drawings in which:

FIG. 13A and FIG. 13B are diagrams of an output feature matrix generated when a stride is used in a convolution;

DETAILED DESCRIPTION OF THE EMBODIMENTS

Figure 1:
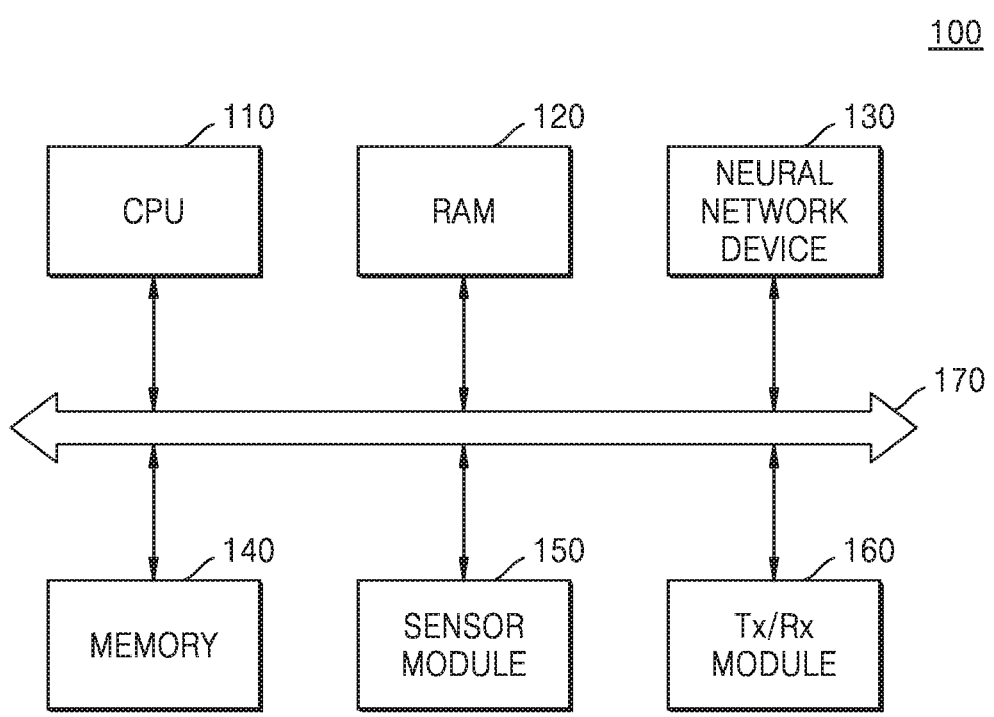
FIG. 1 is a block diagram of an electronic system according to some example embodiments of the inventive concepts.
Figure 2:
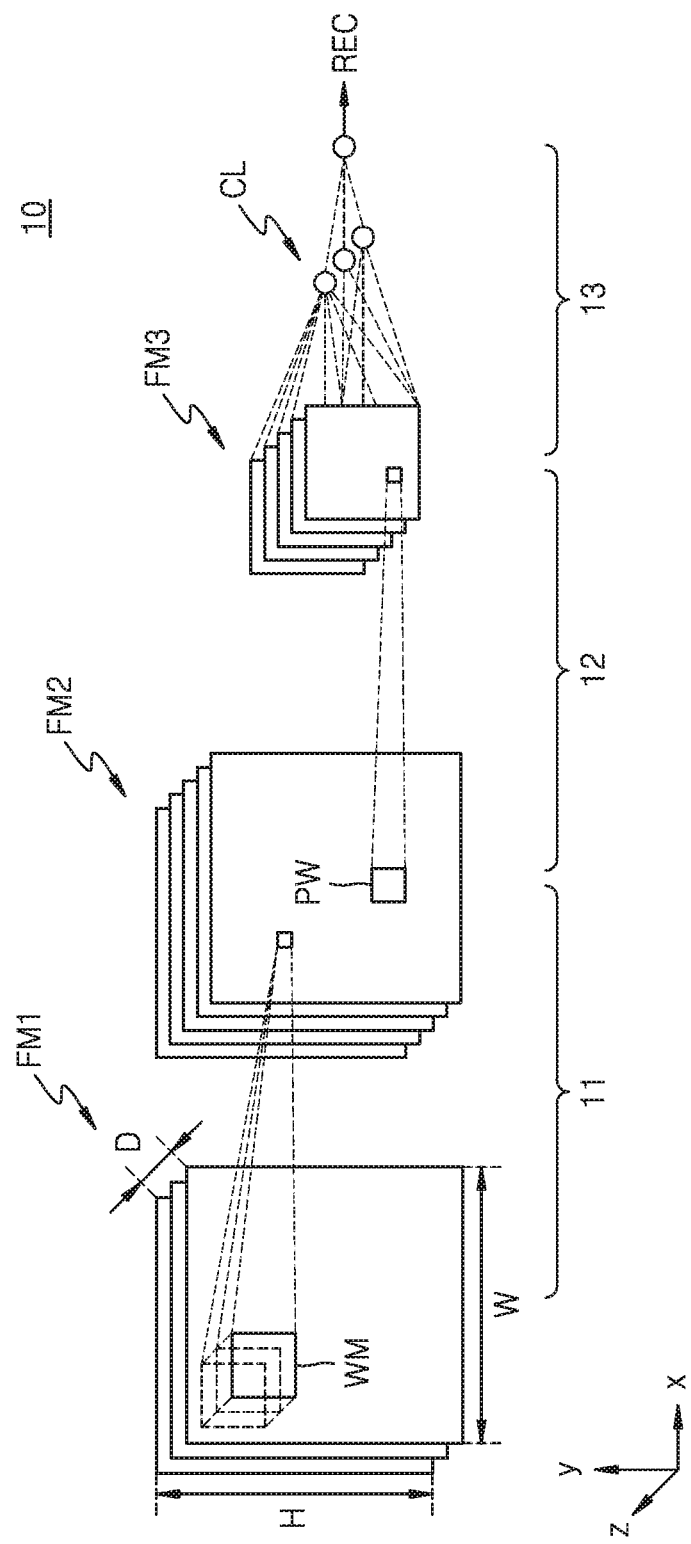
FIG. 2 is a diagram of a neural network architecture according to some example embodiments.
Figure 3:
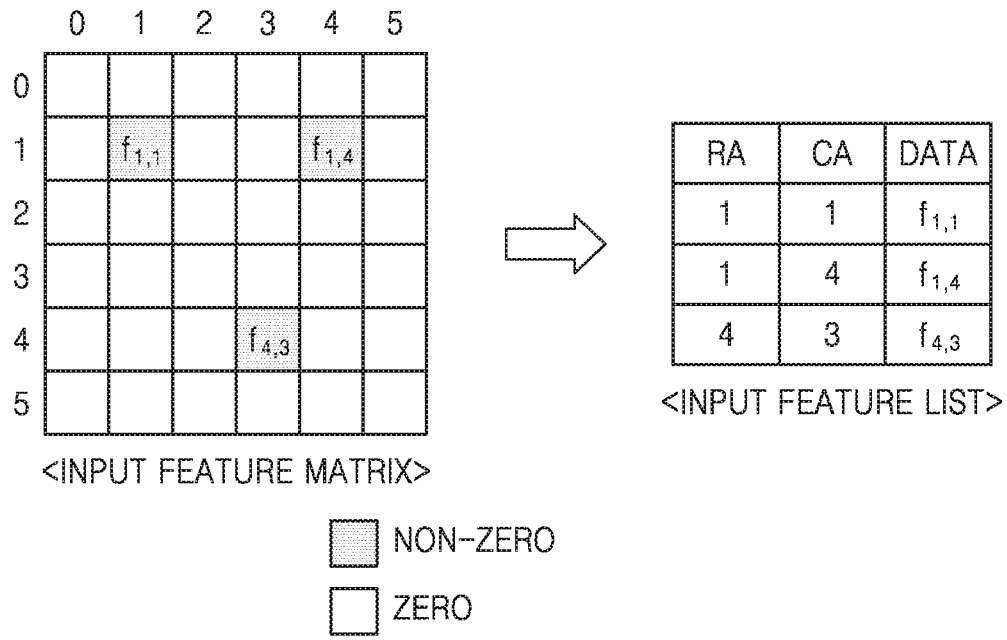
FIG. 3 is a diagram of an input feature list according to some example embodiments of the inventive concepts.

FIG. 1 is a block diagram of an electronic system according to some example embodiments of the inventive concepts. FIG. 2 is a diagram of an example of a neural network architecture according to some example embodiments. FIG. 3 is a diagram of an input feature list according to some example embodiments of the inventive concepts.

An electronic system 100 may analyze input data in real time based on a neural network, extract valid information, and determine a situation or control the elements of an electronic device mounted on the electronic system 100 based on the extracted information. The electronic system 100 may be used in a drone, a robotic device such as an advanced driver assistance system (ADA), a smart television (TV), a smart phone, a medical device, a mobile device, an image display device, a measuring device, and an internet of things (IoT) device. The electronic system 100 may be mounted on any one of other various electronic devices.

Referring to FIG. 1, the electronic system 100 may include a central processing unit (CPU) 110, random access memory (RAM) 120, a neural network device 130, a memory 140, a sensor module (also referred to herein as a "sensor device") 150, and a communication (or Tx/Rx) module (also referred to herein as a "communication device," "a communication interface," and/or a "communication transceiver") 160. The electronic system 100 may also include an input/output module, a security module, and a power control device. Some of the elements (i.e., the CPU 110, the RAM 120, the neural network device 130, the memory 140, the sensor module 150, and the communication module 160) of the electronic system 100 may be mounted on one semiconductor chip. As shown in FIG. 1, the elements of the electronic system may be coupled together via a bus 170.

The CPU 110 controls overall operations of the electronic system 100. The CPU 110 may include a single core processor or a multi-core processor. The CPU 110 may process or execute programs and/or data stored in the memory 140. For example, the CPU 110 may control the function of the neural network device 130 by executing programs ("one or more programs of instructions") stored in the memory 140 to implement some or all of the operations described herein.

The RAM 120 may temporarily store programs, data, or instructions. Programs and/or data stored in the memory 140 may be temporarily stored in the RAM 120 according to the control of the CPU 110 or booting code. The RAM 120 may be implemented as dynamic RAM (DRAM) or static RAM (SRAM).

The neural network device 130 may perform a neural network operation based on input data and may generate an information signal based on a result of the operation ("the neural network operation"). Neural networks may include convolutional neural networks (CNN), recurrent neural networks (RNN), deep belief networks, and restricted Boltzmann machines but are not limited thereto.

The information signal may include one among various kinds of recognition signals such as a voice recognition signal, a thing recognition signal, an image recognition signal, and a biometric recognition signal. The neural network device 130 may receive frame data included in a video stream as input data and may generate a recognition signal with respect to a thing, which is included in an image represented by the frame data, from the frame data. However, the inventive concepts are not limited thereto. The neural network device 130 may receive various kinds ("types") of input data according to the type or function of an electronic device on which the electronic system 100 is mounted and may generate a recognition signal according to the input data. An example of a neural network architecture will be briefly described with reference to FIG. 2.

FIG. 2 shows the structure of a convolution neural network as an example of a neural network architecture. Referring to FIG. 2, a neural network 10 may include a plurality of layers, for example, first, second, and third layers 11, 12, and 13. The first layer 11 may be a convolution layer, the second layer 12 may be a pooling layer, and the third layer 13 may be an output layer. The output layer may be a fully-connected layer. The neural network 10 may also include an active layer and may also include another convolution layer, another pooling layer, or another fully-connected layer apart from the first, second, and third layers 11, 12, and 13 shown in FIG. 2.

Each of the first through third layers 11, 12, and 13 may receive input data or a feature map generated in a previous layer as an input feature map and may generate an output feature map or a recognition signal REC, by performing an operation on the input feature map. At this time, the feature map is data which represents various features of input data. Features maps FM1, FM2, and FM3 may have a form of a two-dimensional matrix or a form of a three-dimensional matrix. These feature maps FM1, FM2, and FM3 having a multi-dimensional matrix form may be referred to as feature tensors. The feature maps FM1, FM2, and FM3 have a width (or a column) W, a height (or a row) H, and a depth D, which may respectively correspond to the x-axis, the y-axis, and the z-axis in a coordinate system. The depth D may be referred to as the number of channels.

A location on the xy-plane of a feature map may be referred to as a spatial location. A location on the z-axis of the feature map may be referred to as a channel. A size on the xy-plane of the feature map may be referred to as a spatial size.

The first layer 11 may perform a convolution of the first feature map FM1 and a weight map WM to generate the second feature map FM2. The weight map WM may filter the first feature map FM1 and may be referred to as a filter or a kernel. The depth, i.e., the number of channels of the weight map WM, may be the same as the depth, i.e., the number of channels of the first feature map FM1. The convolution may be performed on the same channels in both the weight map WM and the first feature map FM1. The weight map WM shifts by traversing the first feature map FM1 as a sliding window. The amount of shift may be referred to as a "stride length" or a "stride". During a shift, each weight included in the weight map WM may be multiplied by and added to all feature values in an area where the weight map WM overlaps the first feature map FM1. One channel of the second feature map FM2 may be generated by performing a convolution of the first feature map FM1 and the weight map WM. Although only one weight map WM is shown n FIG. 2, a plurality of weight maps may actually be convolved with the first feature map FM1 to generate a plurality of channels of the second feature map FM2. In other words, the number of channels of the second feature map FM2 may correspond to the number of weight maps.

The second layer 12 may perform pooling to generate the third feature map FM3. The pooling may be referred to as sampling or downsampling. A two-dimensional pooling window PW may be shifted on the second feature map FM2 and a maximum value among feature values (or an average of the feature values) in an area where the pooling window PW overlaps the second feature map FM2 may be selected, so that the third feature map FM3 may be generated from the second feature map FM2. The number of channels of the third feature map FM3 may be the same as the number of channels of the second feature map FM2.

In some example embodiments, the pooling window PW may be shifted on the second feature map FM2 by a unit of the size of the pooling window PW. The amount of shift, i.e., the stride of the pooling window PW, may be the same as the length of the pooling window PW. Accordingly, the spatial size of the third feature map FM3 may be smaller than that of the second feature map FM2. However, the inventive concepts are not limited thereto. The spatial size of the third feature map FM3 may be the same as or larger than that of the second feature map FM2. The spatial size of the third feature map FM3 may be determined according to the size of the pooling window PW, a stride length, and whether zero-padding is performed or not.

The third layer 13 may combine features of the third feature map FM3 and categorize a class CL of the input data. The third layer 13 may also generate the recognition signal REC corresponding to the class CL. The input data may correspond to frame data included in a video stream. At this time, the third layer 13 may extract a class corresponding to a thing included in an image represented by the frame data based on the third feature map FM3 provided from the second layer 12, recognize the thing, and generate the recognition signal REC corresponding to the thing.

In a neural network, low-level layers, e.g., convolution layers, may extract low-level features an edge or gradient of a face image) from input data or an input feature map and high-level layers, e.g., fully-connected layers, may extract or detect high-level features, i.e., classes (e.g., eyes and a nose of the face image) from the input feature map.

Referring to FIG. 1, the neural network device 130 may perform an index-based neural network operation. At this time, an index indicates the spatial location of a feature or a weight. The index may include a first index and a second index which respectively correspond to a row and a column of a two-dimensional matrix. Restated, each index of an input feature index and a weight index may include a first index and a second index, where the first index of the input feature index corresponds to a row of an input feature matrix, the second index of the input feature index corresponds to a column of the input feature matrix, the first index of the weight index corresponds to a row of a weight matrix, and the second index of the weight index corresponds to a column of the weight matrix.

The neural network device 130 may perform an operation corresponding to at least one of a plurality of layers of a neural network described above with reference to FIG. 2 based on an index. The neural network device 130 may generate an input feature list including an index and data, which correspond to each input feature, based on an input feature map in matrix form (hereinafter, referred to as an input feature matrix) and may perform an operation based on the index.

As shown in FIG. 3, the neural network device 130 may generate an input feature list from an input feature matrix. The input feature list may include a first index RA and a second index CA which correspond to a spatial location of an input feature. An index may be referred to as an address and the first index RA and the second index CA may be referred to as a row address and a column address, respectively. The input feature list may also include data, i.e., an input feature value, corresponding to each index.

An index-based neural network operation may include an index operation. The index operation is performing an operation on each input feature index in an input feature list and an index of a different parameter. The index operation may be referred to as index remapping. When the index operation is performed, a data operation, i.e., an operation on an input feature value, may be simplified or skipped.

As shown in FIG. 3, the input feature list may include an index and data which correspond to each of input features $f_{1,\ 1}$, $f_{1,\ 4}$, and $f_{4,\ 3}$ having non-zero values. The neural network device 130 may perform an index-based operation on input features having non-zero values.

Meanwhile, a weight map used in a convolution operation may be converted into a weight list and provided to the neural network device 130. The weight list may include an index and data which correspond to each weight having a non-zero value. To avoid confusion about terms, an index and data in an input feature list will be referred to as an input feature index and an input feature value and an index and data in a weight list will be referred to as a weight index and a weight value.

The neural network device 130 may perform a convolution operation on input features and weights, which have non-zero values, based on indices in an input feature list and indices in a weight list.

A zero value in a neural network operation does not influence the result of the operation. Accordingly, the neural network device 130 may generate an input feature list based on input features having non-zero values and perform an operation based on indices in the input feature list, so that the neural network device 130 may perform an operation on input features only having non-zero values. As a result, an operation on input features having the zero value may be skipped.

However, the inventive concepts may not be limited thereto. An input feature list may also include an index and data which correspond to an input feature having the zero value. The neural network device 130 may generate the input feature list based on input features having either the zero value or a non-zero value and may perform an operation based on indices.

Referring back to FIG. 1, the memory 140 is storage for storing data. The memory 140 may store an operating system (OS), various programs, and various data. The memory 140 may store an intermediate result, e.g., an output feature map, generated during an operation in a form of an output feature list or an output feature matrix. A compressed output feature map may be stored in the memory 140. The memory 140 may also store various parameters, e.g., a weight map or a weight list, used by the neural network device 130.

The memory 140 may be DRAM but is not limited thereto. The memory 140 may include at least one among volatile memory and nonvolatile memory. The nonvolatile memory includes read-only memory (ROM), programmable ROM (PROM), electrically programmable ROM (EPROM), electrically erasable programmable ROM (EEPROM), flash memory, phase-change RAM (PRAM), magnetic RAM (MRAM), resistive RAM (RRAM), and ferroelectric RAM (FeRAM). The volatile memory may include DRAM, SRAM, synchronous DRAM (SDRAM), PRAM, MRAM, RRAM, and FeRAM. Alternatively, the memory 140 may include at least one among a hard disk drive (HDD), a solid state drive (SSD), compact flash (CF), secure digital (SD), micro-SD, mini-SD, extreme digital (xD), and a memory stick.

The sensor module 150 may collect surrounding information of an electronic device mounted on the electronic system 100. The sensor module 150 may sense or receive a signal (e.g., a video signal, an audio signal, a magnetic signal, a bio-signal, or a touch signal) from outside the electronic device and may convert the sensed or received signal into data. For this operation, the sensor module 150 may include at least one of various sensing devices such as a microphone, an image pickup device, an image sensor, a light detection and ranging (LIDAR) sensor, an ultrasonic sensor, an infrared sensor, a bio-sensor, and a touch sensor.

The sensor module 150 may provide the data to the neural network device 130 as input data. For example, the sensor module 150 may include an image senor. At this time, the sensor module 150 may shoot an external circumstance of an electronic device, generate a video stream, and sequentially provide consecutive data frames of the video stream to the neural network device 130 as input data. However, the inventive concepts are not limited thereto. The sensor module 150 may provide various types of data to the neural network device 130.

The communication module 160 may include various types of wired or wireless interfaces which communicate with external devices. For example, the communication module 160 may include a communication interface which enables access to a local area network (LAN), a wireless LAN (WLAN) like wireless fidelity (Wi-Fi), a wireless personal area network (WPAN) like Bluetooth, a wireless universal serial bus (USB), ZigBee, near field communication (NFC), radio-frequency identification (RFID), power line communication (PLC), or a mobile cellular network like third generation (3G), fourth generation (4G), or long term evolution (LTE).

The communication module 160 may receive a weight map or a weight list from an external server. The external server may perform training based on massive learning data and may provide a weight map or a weight list, which includes trained weights, to the electronic system 100. The received weight map or weight list may be stored in the memory 140.

The communication module 160 may generate and/or communicate an information signal based on a result of an operation (e.g., an output feature map, generated during an operation in a form of an output feature list or an output feature matrix).

As described above, according to some example embodiments of the inventive concepts, the neural network device 130 may efficiently perform a neural network operation by performing the neural network operation based on an index. In particular, the neural network device 130 may generate an input feature list corresponding to an input feature having a non-zero value in a sparse neural network in which non-zero values are sparse in a feature map or a weight map and perform an operation on the input feature having the non-zero value based on the input feature list, thereby reducing the amount of operations. As the amount of operations is reduced, the efficiency of the neural network device 130 is increased and power consumption of the neural network device 130 and the electronic system 100 is decreased. Various embodiments of an index-based neural network operation method will be described in detail below.

Figure 4:
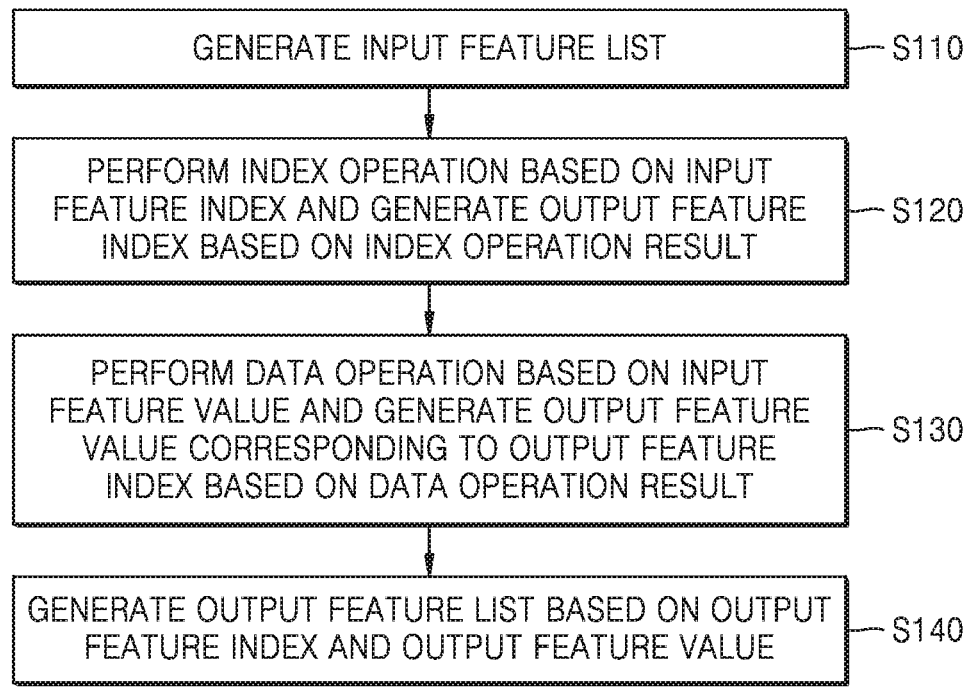
FIG. 4 is a flowchart of an index-based neural network operation method according to some example embodiments of the inventive concepts.

FIG. 4 is a flowchart of an index-based neural network operation method according to some example embodiments of the inventive concepts. The operation method illustrated in FIG. 4 may be performed in the neural network device 130 and may be applied to the operation of the layers 11, 12, and 13 of the neural network 10 shown in FIG. 2.

Referring to FIG. 4, the neural network device 130 may generate an input feature list in operation S110. For example, the neural network device 130 may generate the input feature list from an input feature map having a matrix form. As described above with reference to FIG. 3, the input feature list may include an input feature index and an input feature value which correspond to each input ("input feature"). The input may have a non-zero value. The input feature index may indicate a location of the input feature on an input feature map.

The neural network device 130 may perform an index operation based on the input feature index in the input feature list and generate an output feature index based on the index operation result in operation S120. The index operation result of the index operation may be an output feature index.

The neural network device 130 may perform a data operation based on the input feature value in the input feature list and may generate an output feature value corresponding to the output feature index based on the data operation result in operation S130. At this time, when the output feature index generated in operation S120 is not mapped in the output feature map, the neural network device 130 may skip the data operation. The data operation result of the data operation may be an output feature value corresponding to the output feature index.

The neural network device 130 may generate an output feature list based on the output feature index and the output feature value in operation S140. The neural network device 130 performs operations S120 and S130 on all input features in the input feature list to generate the output feature list. Restated, the neural network device 130 may generate, at operation S110, an input feature list that includes a plurality of input feature indices and a plurality of input feature values, the plurality of input feature indices corresponding to separate input features of a plurality of input features, the plurality of input feature values corresponding to separate input features of the plurality of input features, and the neural network device 130 may further perform, based on separate, respective input features, separate sets of operations S120 and S130 to generate a plurality of output feature indices based on the separate, respective input feature indices of the input feature list and to generate a plurality of output feature values based on the separate, respective input feature values, respectively. As part of performing separate sets of operations S120 and S130 based on separate, respective input features, the neural network device 130 may filter a limited selection of output indices, of the plurality of output indices, based on a determination that the limited selection of output indices do not influence an output result during the operation, such that the plurality of output indices is filtered to include a remainder selection of output indices that do influence an output result during the operation. The neural network device 130 may store the output feature list in a memory. The memory may be located inside the neural network device 130 or may be a memory, e.g., the memory 140 shown in FIG. 1, located outside the neural network device 130. In some example embodiments, the neural network device 130 may compress the output feature list and store the compressed output feature list in a memory.

In some example embodiments, if the output feature list is for the final layer of a neural network, the neural network device 130 may generate an information signal based on the output feature list.

The neural network device 130 may reduce the amount of operations by performing an operation on each input feature index and each input feature value and filtering output indices (e.g., a limited selection of output indices of the plurality of output indices) which do not influence an output result during the operation. In addition, the neural network device 130 may easily process various operations of a neural network based on an index operation. As a result, the functioning of an electronic system 100 that includes the neural network device 130 may be improved based on performing the aforementioned one or more operations.

Figure 5:
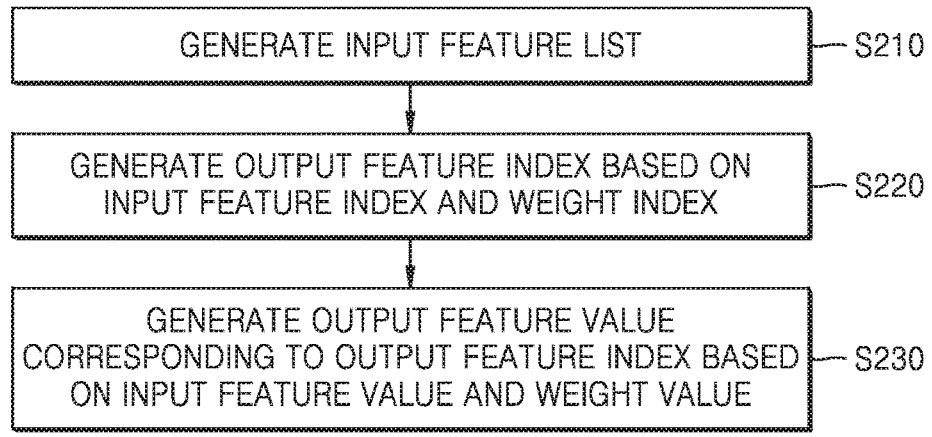
FIG. 5 is a flowchart of an index-based convolution operation method according to some example embodiments of the inventive concepts.

FIG. 5 is a flowchart of an index-based convolution operation method according to some example embodiments of the inventive concepts. The operation method illustrated in FIG. 5 may be performed in the neural network device 130 shown in FIG. 1.

Referring to FIG. 5, the neural network device 130 may generate an input feature list from an input feature map, i.e., an input feature matrix, in operation S210. The input feature list may include an input feature index and an input feature value which correspond to each of input features of the input feature matrix. The input feature index may include a first index and a second index which respectively correspond to a row and a column of the input feature matrix. The neural network device 130 may generate the input feature list corresponding to at least one input feature having a non-zero value in the input feature matrix.

Thereafter, the neural network device 130 may perform an index-based convolution operation based on the input feature list and a weight list which has been stored in advance.

The neural network device 130 may generate an output feature index based on an input feature index and a weight index in operation S220. The neural network device 130 may generate the output feature index by performing an operation ("first operation") on the input feature index and the weight index.

The neural network device 130 may generate the output feature index by performing an operation on the input feature index corresponding to the input feature having a non-zero value and a weight index corresponding to a weight having a non-zero value.

In detail, the neural network device 130 may generate the output feature index by adding the input feature index and the weight index. The neural network device 130 may add a first index of the input feature index and a first index of the weight index and add a second index of the input feature index and a second index of the weight index.

The neural network device 130 may generate an output feature value corresponding to the output feature index based on the input feature value and a weight value in operation S230. The neural network device 130 may generate the output feature value by performing a data operation ("second operation") based on the input feature value and the weight value. The neural network device 130 may multiply the input feature value by the weight value and may generate the output feature value based on a multiplication value resulting from the multiplication. The neural network device 130 may generate the output feature value by adding a plurality of multiplication values corresponding to the output feature index. The input feature value and the weight value may be non-zero.

The neural network device 130 may perform an index-based convolution operation by performing the index operation based on the input feature index and the weight index in the weight list in operation S220 and performing the data operation based on the input feature value and the weight value in operation S230. In some example embodiments, if the output feature is for the final layer of a neural network, the neural network device 130 may generate an information signal based on the output feature value.

In some example embodiments, the index-based convolution operation method may also include an operation in it which the neural network device 130 generates the weight list from a weight matrix. For example, the neural network device 130 may receive the weight matrix from outside, e.g., outside the neural network device 130 or an external server of an electronic device equipped with the neural network device 130, and may generate the weight list from the weight matrix. The weight list may include a weight index and a weight value which correspond to each of weights included in the weight matrix. The neural network device 130 may generate the weight list corresponding to at least one weight having a non-zero value in the weight matrix. The neural network device 130 may store the weight list and may use the weight index and the weight value in operations S220 and S230. However, the inventive concepts are not limited thereto. The neural network device 130 may receive the weight list from an outside, e.g., outside the neural network device 130 or an external server of an electronic device equipped with the neural network device 130, and may store the weight list and then use the weight list.

Figure 6:
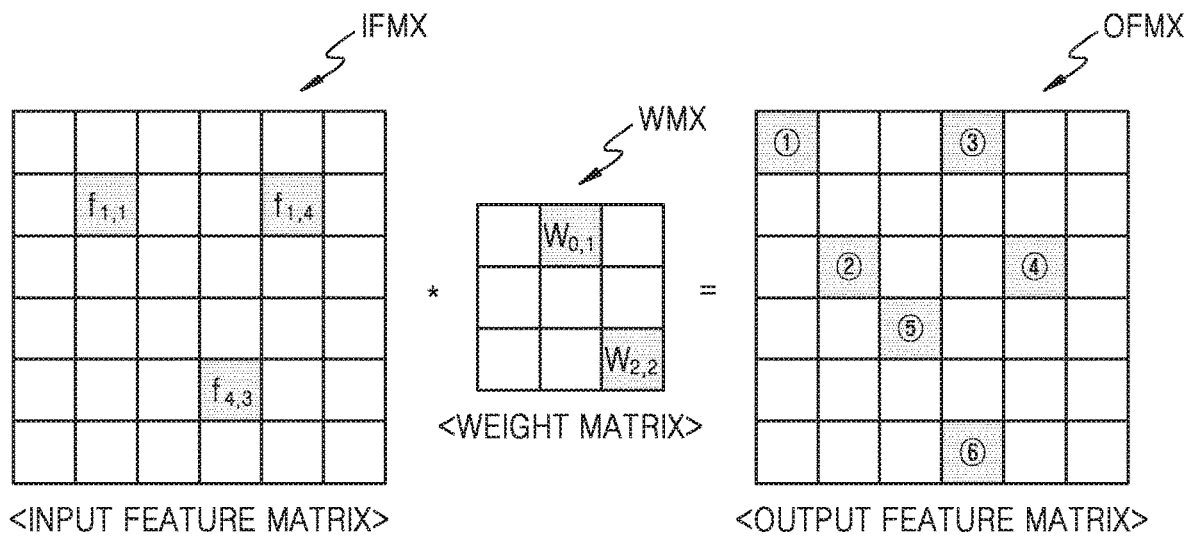
FIG. 6 is a diagram of a convolution operation according to some example embodiments.
Figure 7A:
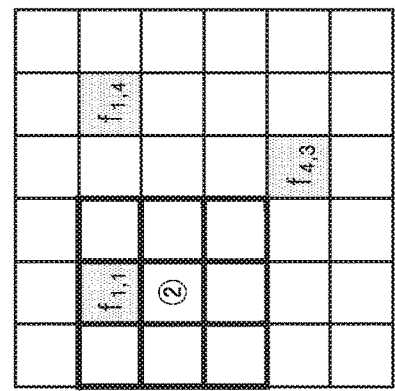
FIG. 7A, FIG. 7B, FIG. 7C, FIG. 7D, FIG. 7E, and FIG. 7F are diagrams of the snapshots of valid operation results in the process of the convolution operation illustrated in FIG. 6.
Figure 7B:
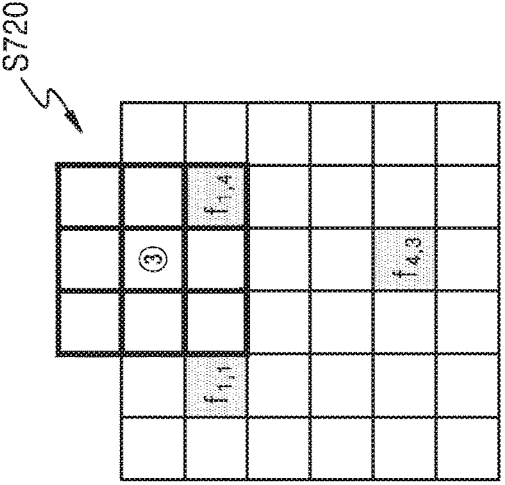
Figure 7C:
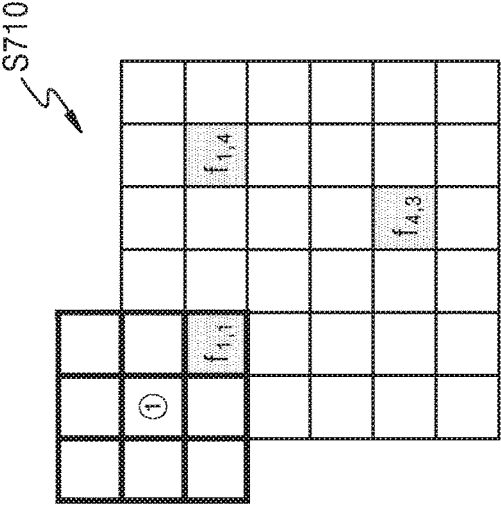
Figure 7D:
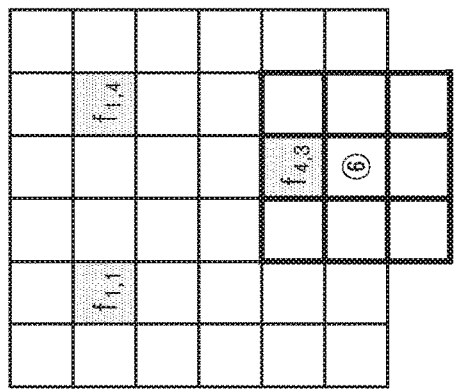
Figure 7E:
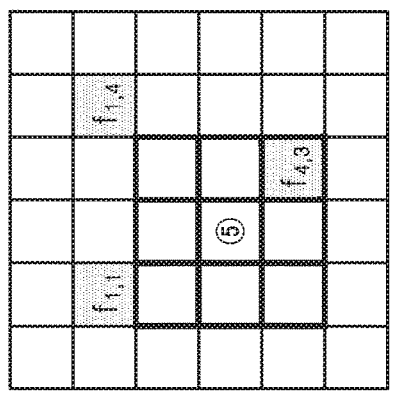
Figure 7F:
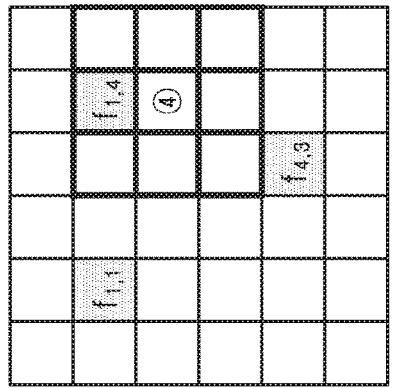

FIG. 6 is a diagram of a convolution operation. FIG. 7A, FIG. 7B, FIG. 7C, FIG. 7D, FIG. 7E, and FIG. 7F are diagrams of the snapshots of valid operation results in the process of the convolution operation illustrated in FIG. 6.

In detail, FIG. 6 shows the convolution operation performed based on an input feature matrix and a weight matrix which have a sparse distribution of non-zero values. FIG. 7A, FIG. 7B, FIG. 7C, FIG. 7D, FIG. 7E, and FIG. 7F show snapshots representing valid operation results S710, S720, S730, S740, S750, and S760, respectively, in the process of a traversal convolution operation used in a usual neural network.

Referring to FIG. 6, the result of a convolution operation (expressed as "*") of an input feature matrix IFMX including non-zero input features $f_{1,1}$, $f_{1,4}$, and $f_{4,3}$ and a weight matrix WMX including non-zero weights $W_{0,1}$ and $W_{2,2}$ may be expressed as an output feature matrix OFMX including output features respectively corresponding to first through sixth locations ①, ②, ③, ④, ⑤, and ⑥.

As described above, when a convolution operation is performed, an input feature having a zero value and/or a weight having a zero value do not influence the operation result. Although a lot of snapshots may be generated during the traversal convolution operation, only six snapshots shown in FIG. 7A, FIG. 7B, FIG. 7C, FIG. 7D, FIG. 7E, and FIG. 7F influence the operation result. As shown in FIG. 7A, FIG. 7B, FIG. 7C, FIG. 7D, FIG. 7E, and FIG. 7F, the output features may correspond to the results of a convolution of the non-zero input features $f_{1,1}$, $f_{1,4}$, and $f_{4,3}$ and each of the non-zero weights $W_{0,1}$ and $W_{2,2}$.

Figure 8A:
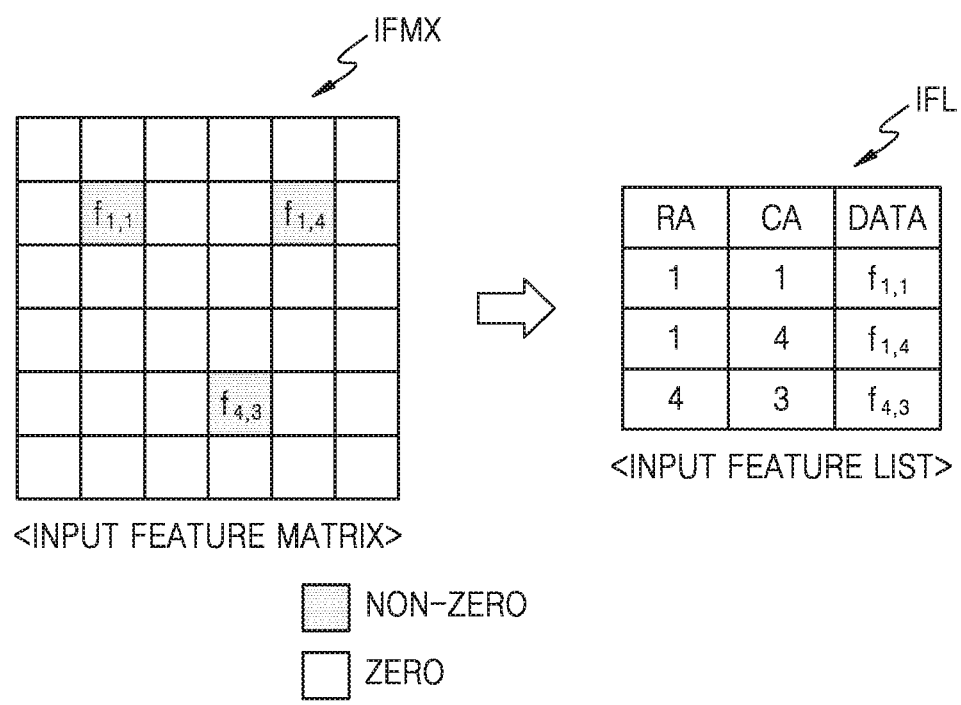
FIG. 8A, FIG. 8B, and FIG. 8C are diagrams for explaining an index-based convolution operation according to some example embodiments of the inventive concepts.
Figure 8B:
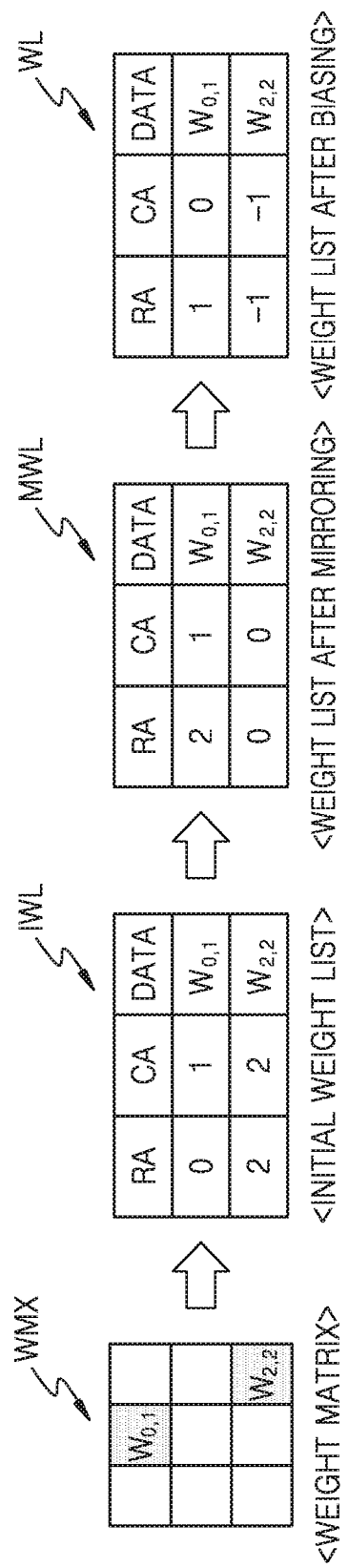
Figure 8C:
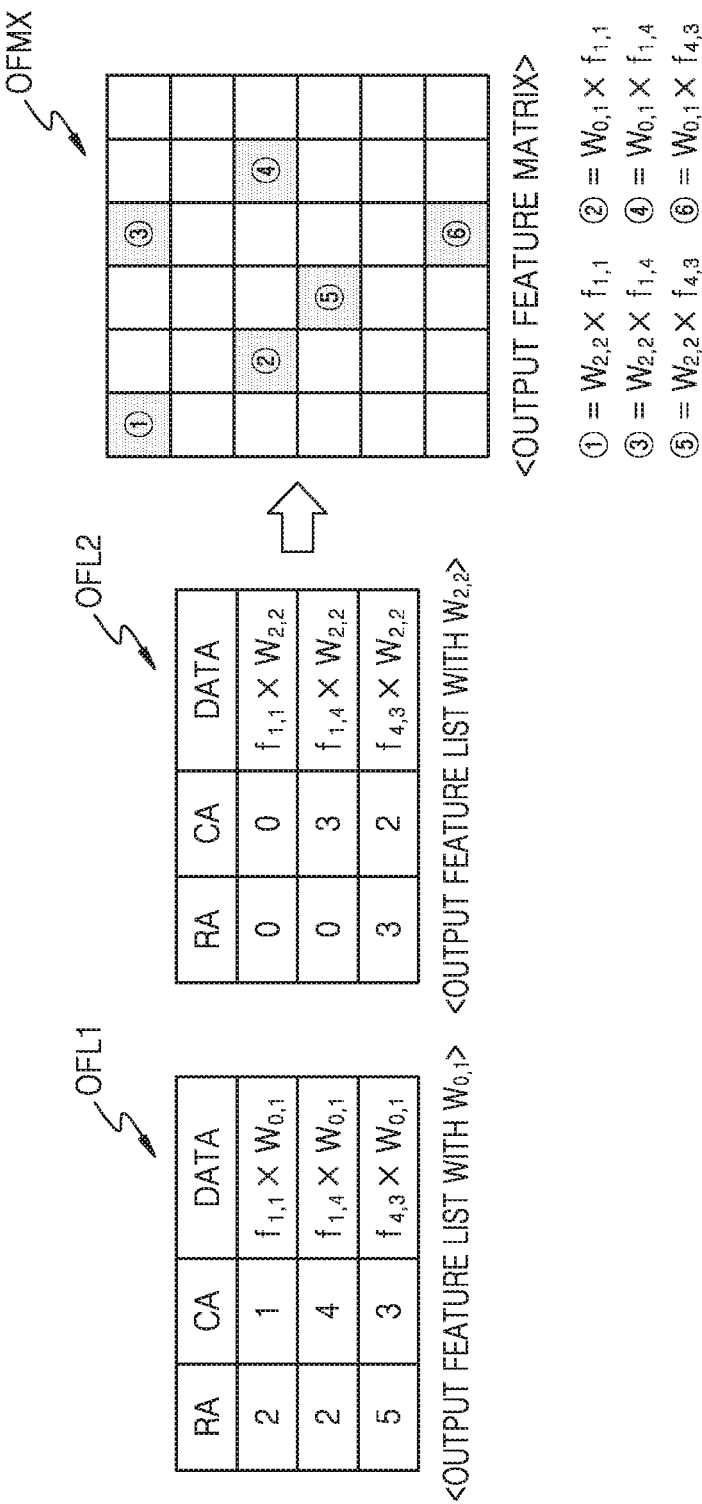

FIG. 8A, FIG. 8B, and FIG. 8C are diagrams for explaining an index-based convolution operation according to some example embodiments of the inventive concepts. FIG. 8A, FIG. 8B, and FIG. 8C show an index-based convolution operation performed on a non-zero input feature and a non-zero weight.

FIG. 8A shows the generation of an input feature list IFL. Referring to FIG. 8A, the neural network device 130 may generate the input feature list IFL with respect to non-zero inputs, e.g., the input features $f_{1,1}$, $f_{1,4}$, and $f_{4,3}$, of the input feature matrix IFMX. The input feature list IFL may include input feature indexes RA and CA and an input feature value DATA with respect to each input feature.

FIG. 8B shows the generation of a weight list WL. The generation of the weight list WL is similar to that of the input feature list IFL. However, an operation of adjusting a weight index in the weight list WL may be additionally performed for a convolution operation. The generation of the weight list WL illustrated in FIG. 8B may be performed in a server providing a weight to the neural network device 130 (shown in FIG. 1) or may be performed, based on a weight matrix provided from a server, in a preprocessing circuit included in the neural network device 130. For convenience's sake in the description, it is assumed that the weight list WL shown in FIG. 8B is generated in the neural network device 130.

The neural network device 130 may generate an initial weight list IWL with respect to non-zero weights, e.g., the weights $W_{0,1}$ and $W_{2,2}$, of the weight matrix WMX. A weight index of the initial weight list IWL indicates a spatial location, e.g., an address, of each of the weights $W_{0,1}$ and $W_{2,2}$. Such a weight index may be referred to as an "initial weight index."

Thereafter, the initial weight index may be adjusted to correspond to a particular operation. The adjusting may include the neural network device 130 generating a mirrored weight list MWL by mirroring a weight index (the "initial weight index") in the initial weight list IWL based on a weight bias index, e.g., (RA, CA)=(1, 1), indicating the center of the weight matrix WMX.

The neural network device 130 may bias mirrored weight indices by subtracting the weight bias index, i.e., (RA, CA)=(1, 1), from a weight index ("mirrored weight index") of the mirrored weight list MWL. As a result, (1, 0) and (−1, −1) may be generated as weight indices of the respective weights $W_{0,1}$ and $W_{2,2}$ and the weight list WL used for the convolution operation may be generated.

FIG. 8C shows an operation on an input feature and a weight based on indices. Referring to FIG. 8C, the neural network device 130 may add an input feature index and a weight index and multiply an input feature value by a weight value.

For example, each of input feature indices (1, 1), (1, 4), and (4, 3) of the respective input features $f_{1,1}$, $f_{1,4}$, and $f_{4,3}$ may be added to the weight index (1, 0) of the weight $W_{0,1}$, so that output feature indices (2, 1), (2, 4), and (5, 3) may be generated. At this time, the first index RA of each input feature index may be added to the first index RA of the weight index and the second index CA of each input feature index may be added to the second index CA of the weight index.

An input feature value of each of the input features $f_{1,1}$, $f_{1,4}$, and $f_{4,3}$ is multiplied by a weight value of the weight $W_{0,1}$, so that a first output feature list OFL1 may be generated with respect to the weight $W_{0,1}$. In addition, each of the input feature indices (1, 1), (1, 4), and (4, 3) of the respective input features $f_{1,1}$, $f_{1,4}$, and $f_{4,3}$ may be added to the weight index (−1, −1) of the weight $W_{2,2}$ and the input feature value of each of the input features $f_{1,1}$, $f_{1,4}$, and $f_{4,3}$ is multiplied by a weight value of the weight $W_{2,2}$, so that a second output feature list OFL2 may be generated with respect to the weight $W_{2,2}$.

Since there is no overlapping output feature index between the first output feature list OFL1 and the second output feature list OFL2, output features in the first output feature list OFL1 and output features in the second output feature list OFL2 may be mapped on a matrix without additional operation. It can be seen that the output feature matrix OFMX shown in FIG. 8C is the same as that shown in FIG. 6.

The traversal convolution operation essentially involves redundancy due to traversal. Accordingly, it is not easy to skip an operation on an input feature and a weight which have the zero value, i.e., a meaningless operation which does not influence an output feature. However, when the index-based convolution operation according to some example embodiments of the inventive concepts is used as shown in FIG. 8C, the neural network device 130 performs an index-based operation based on a non-zero input and a non-zero weight, so that a meaningless operation is removed. As a result, the amount of operations is reduced.

Figure 9A:
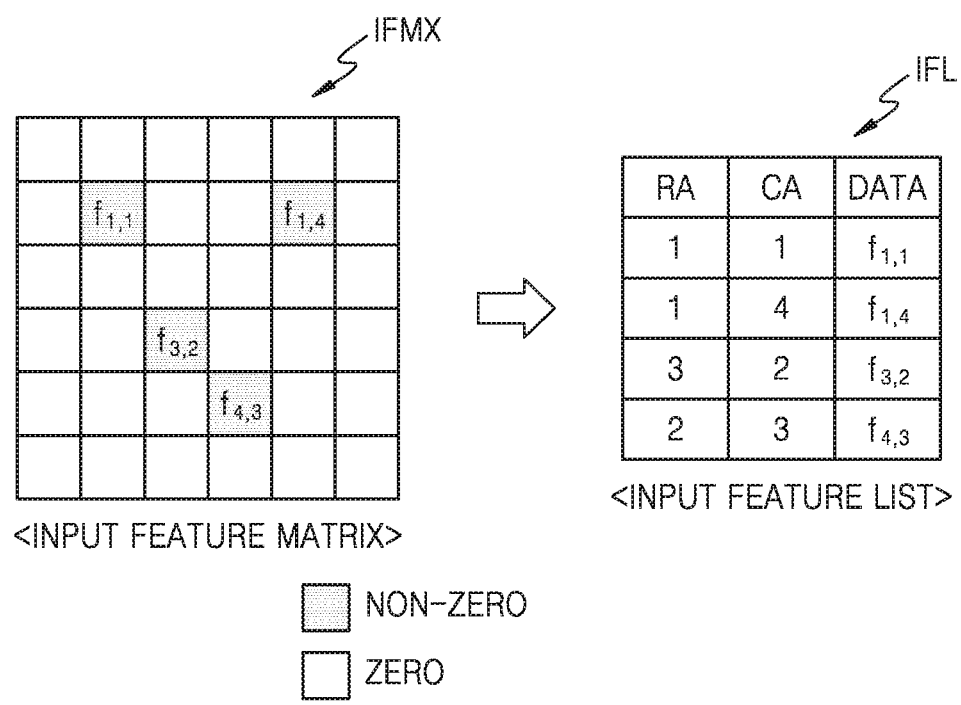
FIG. 9A and FIG. 9B are diagrams for explaining an index-based convolution operation according to some example embodiments of the inventive concepts.
Figure 9B:
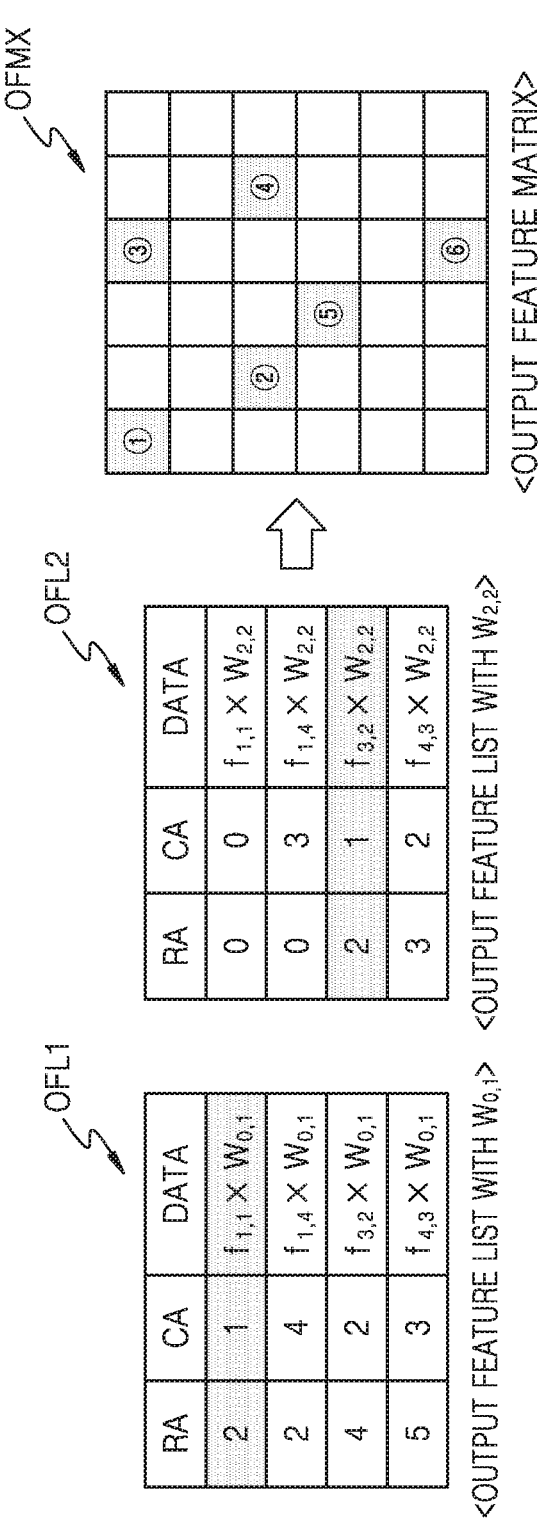

FIGS. 9A and 9B are diagrams for explaining an index-based convolution operation according to some example embodiments of the inventive concepts. FIG. 9A shows the generation of input feature indices. FIG. 9B shows the index-based convolution operation performed based on the input feature indices shown in FIG. 9A and the weight indices shown in FIG. 8B.

Referring to FIG. 9A, the neural network device 130 may generate the input feature list IFL with respect to non-zero inputs, e.g., input features $f_{1,1}$, $f_{1,4}$, $f_{3,2}$, and $f_{4,3}$, of the input feature matrix IFMX. The input feature list IFL may include input feature indices RA and CA and an input feature value DATA with respect to each input feature. When FIG. 9A is compared with FIG. 8A, the input feature $f_{3,2}$ is added to the input feature matrix IFMX, and therefore, an input feature index (3, 2) and an input feature value $f_{3,2}$ which correspond to the input feature $f_{3,2}$ are added to the input feature list IFL.

When an index-based convolution operation is performed based on the input feature list IFL shown in FIG. 9A and the weight list WL shown in FIG. 8B, the first output feature list OFL1 with respect to the weight $W_{0,1}$ and the second output feature list OFL2 with respect to the weight $W_{2,2}$ may generated, as shown in FIG. 9B. At this time, there is an output feature index (2, 1) overlapping between the first output feature list OFL1 and the second output feature list OFL2. A plurality of feature values, i.e., $f_{1,1} \times W_{0,1}$ and $f_{3,2} \times W_{2,2}$, corresponding to the output feature index (2, 1), ay be added and the addition result may be generated as an output feature value corresponding to the output feature index (2, 1).

According to the current embodiments of the inventive concepts, when the index-based convolution operation is used, the neural network device 130 may generate an output feature index using an index operation and an output feature value using a data operation. However, when there is an overlapping output feature index, i.e., when there are a plurality of data operation results, i.e., multiplication values, with respect to one output feature index, the neural network device 130 may add the plurality of multiplication values to generate the output feature value corresponding to the output feature index.

As described above with reference to FIGS. 8A through 9B, the neural network device 130 may perform a convolution operation on an input feature and a weight, which have a non-zero value, based on indices. Accordingly, the amount of operations required for the convolution operation may be reduced. As a result, the operating speed of the neural network device 130 may be increased and the power consumption thereof may be decreased.

Figure 10:
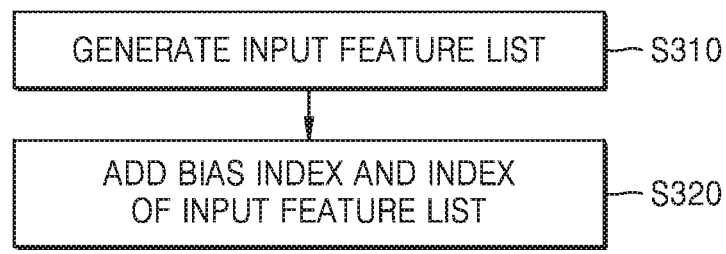
FIG. 10 is a flowchart of an index-based zero-padding method according to some example embodiments of the inventive concepts.

FIG. 10 is a flowchart of an index-based zero-padding method according to some example embodiments of the inventive concepts.

Referring to FIG. 10, the neural network device 130 may generate an input feature list in operation S310. For example, the neural network device 130 may generate an input feature list, which includes an index and data with respect to each of input features having a non-zero value, from an input feature map in matrix.

Figure 11A:
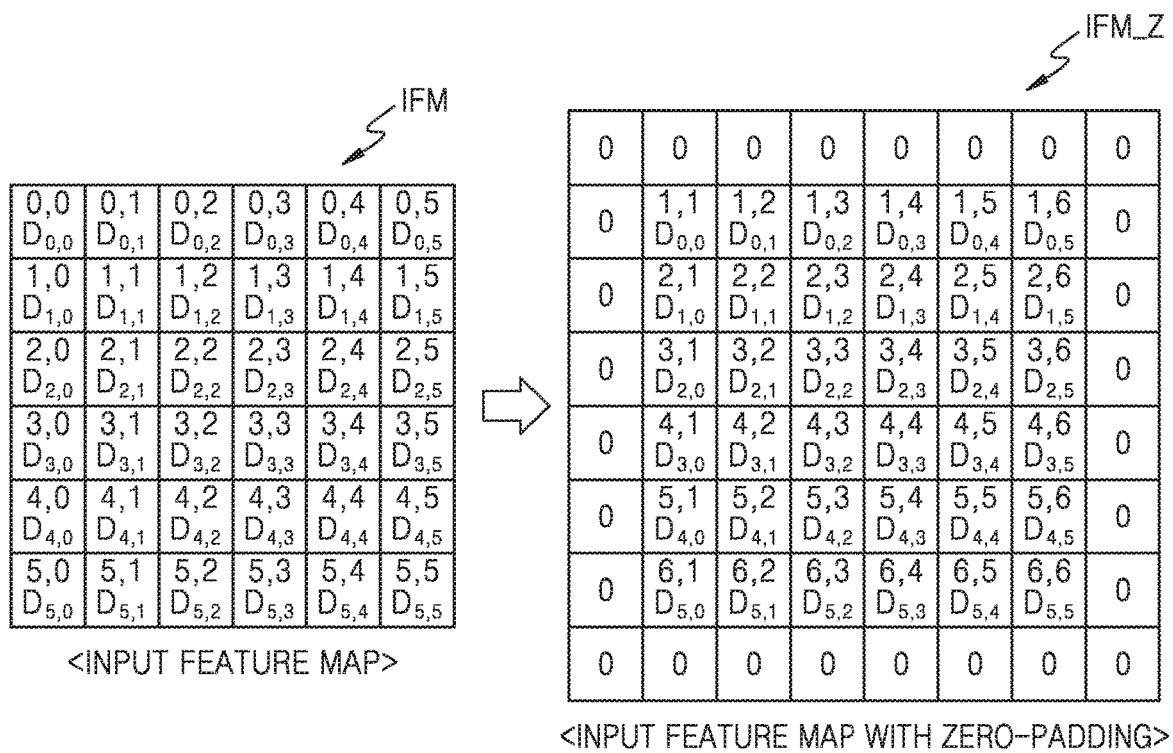
FIG. 11A is a diagram of an example in which zero-padding is applied to an input feature map in a neural network according to some example embodiments.
Figure 11B:
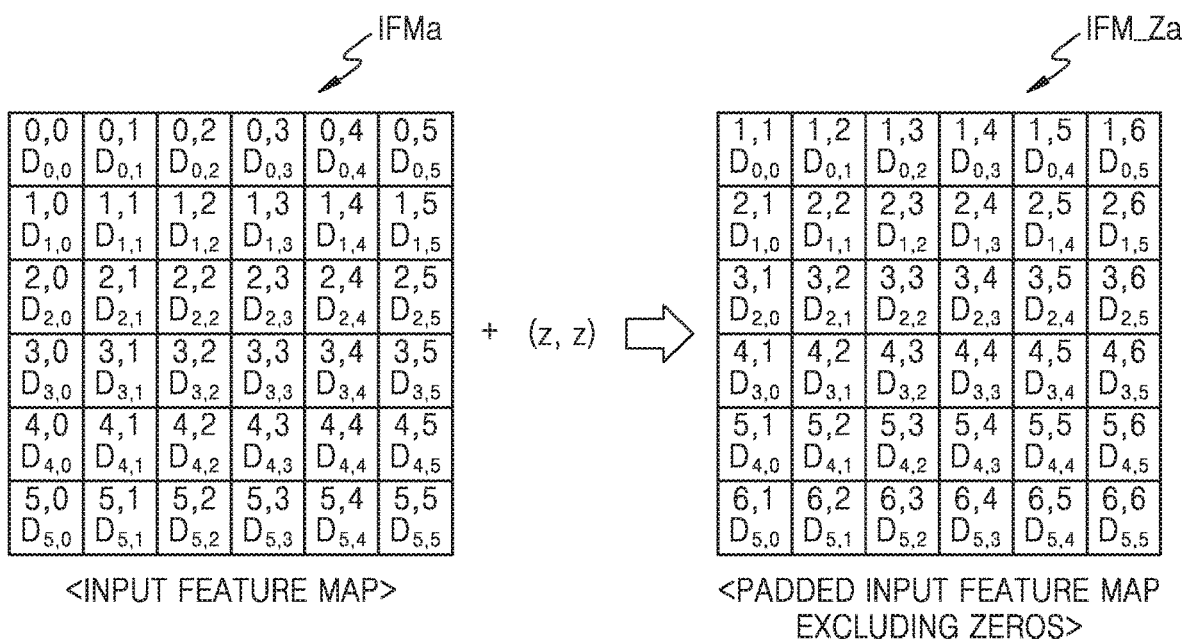
FIG. 11B is a diagram for explaining an index-based zero-padding method according to some example embodiments of the inventive concepts.

The neural network device 130 may add a bias index to each index of the input feature list in operation S320. Consequently, the neural network device 130 may perform zero-padding. This will be described in detail with reference to FIGS. 11A and 11B, FIG. 11A is a diagram of an example in which zero-padding is applied to an input feature map IFM in a neural network. FIG. 11B is a diagram for explaining an index-based zero-padding method, according to some example embodiments of the inventive concepts. In the drawings, a figure at the top of each pixel is an index of an input feature and a figure at the bottom of each pixel is an input feature value.

Zero-padding in a neural network is adding zeros to the input feature map IFM in all outward directions, i.e., row and column directions. When zero-padding is applied to the input feature map IFM, an input feature map with zero-padding, i.e., a zero-padded input feature map IFM_Z may be generated. When one zero is added to every outward direction of the input feature map IFM, as shown in FIG. 11A, a location, i.e., an index, of each input feature may be increased by 1. For example, an index (0, 0) of an input feature $D_{0, 0}$ may be changed into (1, 1). As described above, when "n (where "n" is an integer of at least 1)" zeros are added to the input feature map IFM in each outward direction, an index of each input feature may be increased by "n". The number of zeros added in each direction (hereinafter, referred to as a length of a zero value or a zero-value length), "n", may vary with the kind and characteristic of an operation performed based on an input feature after zero-padding is applied.

When zero-padding is applied to the input feature map IFM in matrix form during a traversal convolution operation, an output feature map having the same size as the input feature map IFM may be generated. A neural network device performing the traversal convolution operation needs to include a control logic, which adds zeros to the input feature map IFM, to support the zero-padding.

FIG. 11B is a diagram for explaining an index-based zero-padding method, according to some example embodiments of the inventive concepts. In detail, FIG. 11B shows an input feature map IFMa of input features having a non-zero value and a padded input feature map IFM_Za excluding zeros which have been generated by applying index-based zero-padding to the input feature map IFMa. In FIG. 11B, the input feature maps IFMa and IFM_Za are input feature lists and are presented in matrix form for convenience's sake in the description. IFMa may be referred to as an initial input feature list.

An operation on an input feature having the zero value may be skipped in an index-based neural network operation. When using zero-padding, the neural network device 130 may generate the input feature map IFMa, i.e., the initial input feature list, including input features having a non-zero value and may generate the padded input feature map IFM_Za, i.e., a padded input feature list, excluding zeros generated by applying index-based zero-padding to the input feature map IFMa. Restated, the neural network device 130 may generate an initial input feature list IFMa that includes an initial input feature index corresponding to a location of the input feature and an input feature value corresponding to the input feature.

The neural network device 130 performing the index-based neural network operation may generate the padded input feature map IFM_Za by remapping indices in the input feature list, i.e., the input feature map IFMa in list form, based on a bias index (z, z), also referred to herein as a "feature bias index." For example, the neural network device 130 may add the bias index (z, z) to the indices of input features of the input feature map IFMa to remap the indices. At this time, the bias index (z, z) may be determined according to a zero-value length. For example, when one zero is added to the input feature map IFM in all outward directions of the input feature map IFM, as shown in FIG. 11A, that is, when the zero-value length is 1, the bias index may be set to (1, 1). When the zero-value length is 2, the bias index (z, z) may be set to (2, 2). When the zero-value length is "n", the bias index (z, z) may be set to (n, n). As described above, the bias index (z, z) may be set based on the zero-value length.

FIG. 11B shows the padded input feature map IFM_Za excluding zeros in a case where one zero is added in all outward directions of the input feature map IFMa. The neural network device 130 may remap the indices of the input features by adding the bias index (1, 1) to the indices of the input feature map IFMa. For example, the bias index (1, 1) is added to the index (0, 0) of the input feature $D_{0, 0}$ of the input feature map IFMa, so that the index of the input feature $D_{0, 0}$ may be remapped from (0, 0) to (1, 1). The bias index (1, 1) is added to the index (2, 3) of the input feature so that the index of the input feature $D_{2, 3}$ may be remapped from (2, 3) to (3, 4). The neural network device 130 may add the bias index (1, 1) to the index of each of input features $D_{0, 0}$ through $D_{5, 5}$ of the input feature map IFMa, thereby generating the padded input feature map IFM_Za excluding zeros.

As described above, the neural network device 130 performing an index-based neural network operation may remap the indices of the input feature map IFMa in list form based on the bias index z, z se according to a zero-value length, thereby easily generating the padded input feature map IFM_Za excluding zeros without using a separate control logic for zero-padding.

Figure 12:
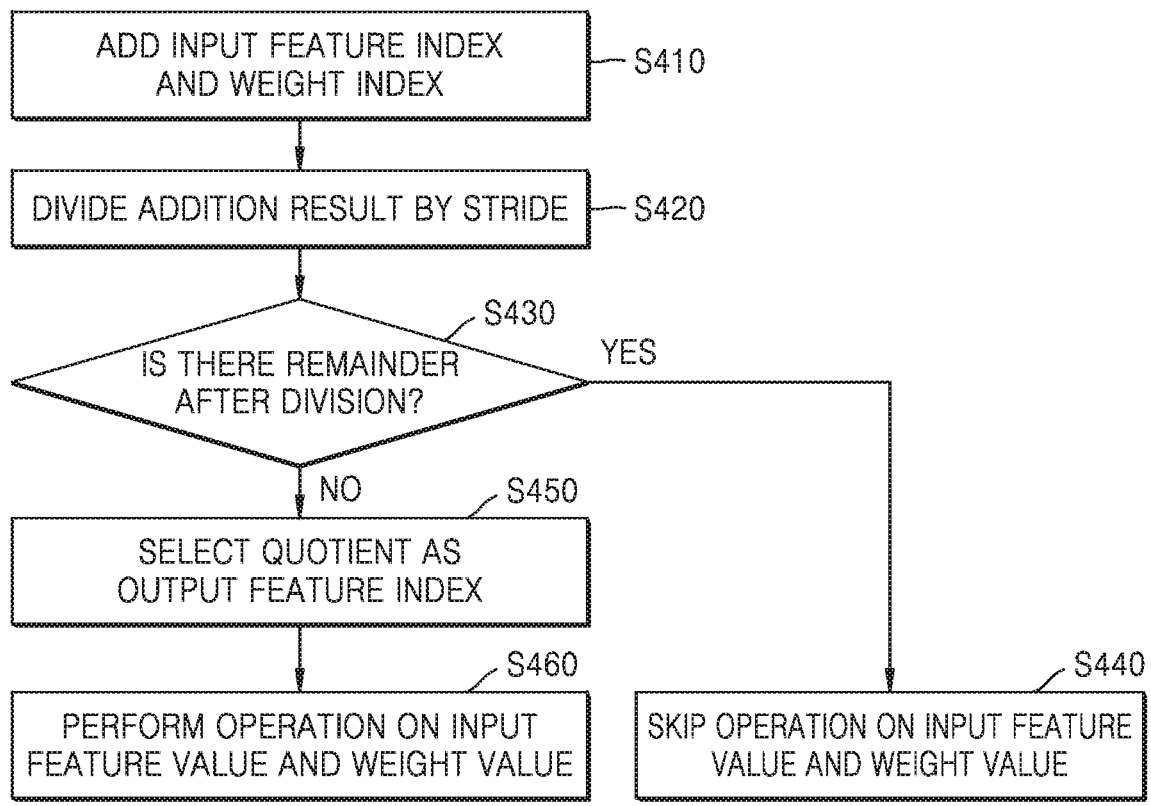
FIG. 12 is a flowchart of a method of using a stride in an index-based convolution operation, according to some example embodiments of the inventive concepts.

FIG. 12 is a flowchart of a method of using a stride in an index-based convolution operation, according to some example embodiments of the inventive concepts. The stride is performed during the convolution operation and may be performed in operations S220 and S230 shown in FIG. 5.

Referring to FIG. 12, the neural network device 130 may add an input feature index and a weight index in operation S410 and may divide the addition result, i.e., the added-up index, by a stride length in operation S420.

The neural network device 130 may determine whether there is a remainder of the division in operation S430. When there is a remainder, the neural network device 130 may skip an operation on an input feature index and a weight value in operation S440. When there is a remainder of the division, the added-up index is not mapped on an output feature map, and therefore, the result of a data operation on the index does not influence the output feature map. Accordingly, the neural network device 130 may skip the operation on the input feature value and the weight value.

Otherwise, when there is no remainder of the division (e.g., upon completion of the dividing), the neural network device 130 may select a quotient as an output feature index in operation S450 and may perform operations multiplication and addition) on the input feature value and the weight value in operation S460. An operation value resulting from the operation may be provided as an output feature value for the output feature index.

For example, when there is no remainder after dividing a result of adding an input feature index of a first input feature and a weight index of a first weight by a stride length, a quotient may be selected as an output feature index and a result of performing an operation on an input feature value corresponding to the first input feature and a weight value corresponding to the first weight may be provided as an output value for the output feature index. When there is a remainder after dividing a result of adding an input feature index of a second input feature and a weight index of a second weight by the stride length, the result of the operation on the input feature index of the second input feature and the weight index of the second weight is not selected as an output feature index. Accordingly, an operation on an input feature value corresponding to the second input feature and a weight value corresponding to the second weight may be omitted.

As described above, a stride may be easily used in an index-based convolution operation through an operation on indices and the amount of operations may be decreased.

Figures 13A, 13B:
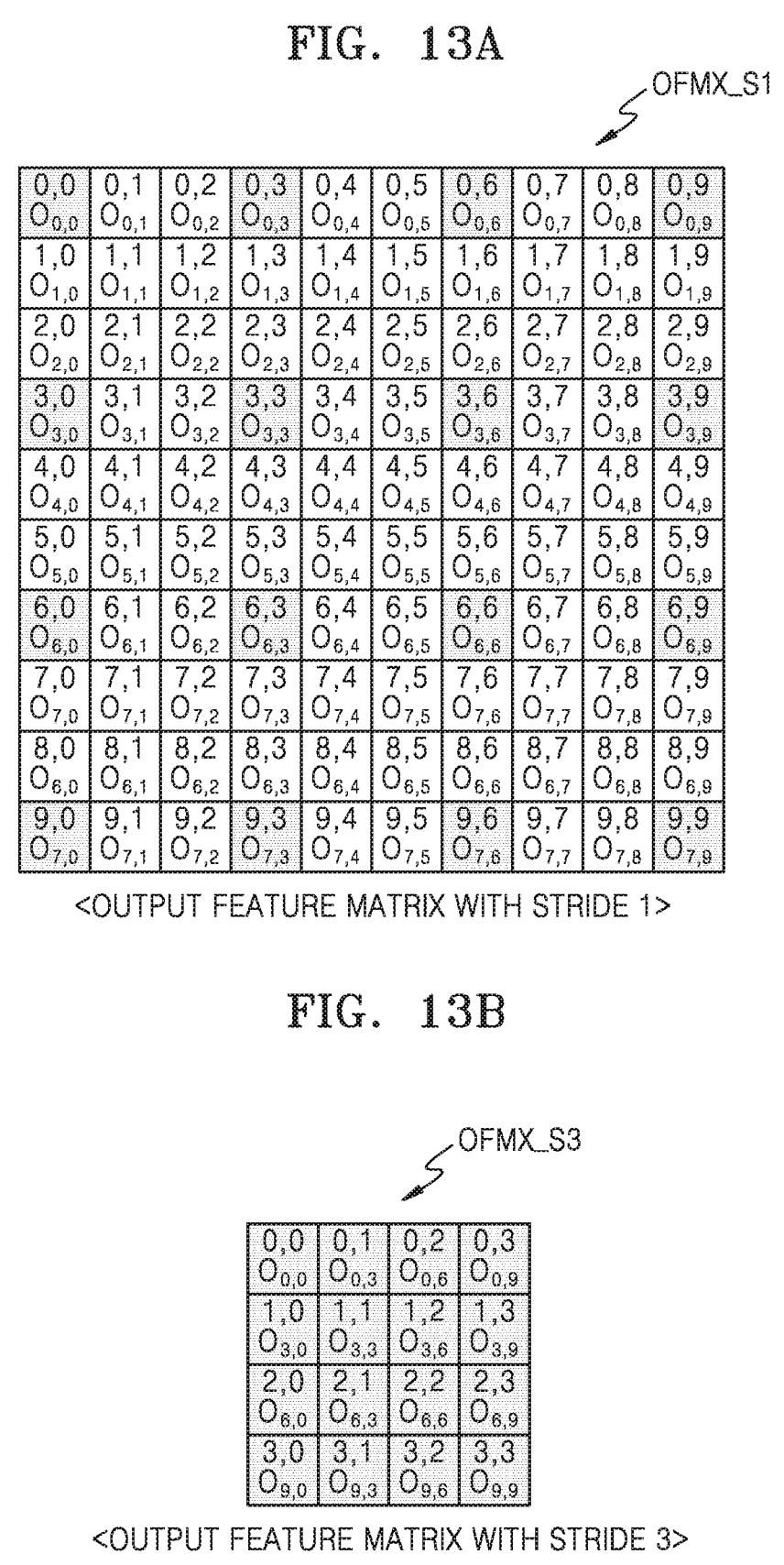

FIGS. 13A and 13B are diagrams of an output feature matrix generated when a stride is used in a convolution.

FIG. 13A shows an example in which a stride is applied to a matrix pixel-by-pixel. FIG. 13B shows an example in which a stride is applied per three pixels on a matrix. As a stride length is increased, the size of an output feature matrix may be decreased. When an output feature matrix OFMX_S1 shown in FIG. 13A is compared with an output feature matrix OFMX_S3 shown in FIG. 13B, it can be seen that output features marked with shaded boxes in the output feature matrix OFMX_S1 shown in FIG. 13A compose the output feature matrix OFMX_S3 shown in FIG. 13B and only indices of the output features are changed.

As described above, when an index-based convolution operation is used according to some example embodiments of the inventive concepts, the neural network device 130 may add an input feature index and a weight index, may divide the added-up index by a stride length, and may select a quotient as an output feature index when there is no remainder after the division.

For example, since the stride length is 1 in FIG. 13A, an index of each output feature in the output feature matrix OFMX_S1 is an added-up index resulting from an addition of an input feature index and a weight index.

When there is no remainder after dividing an added-up index by a stride length of 3 in the example shown in FIG. 13B, a quotient may be generated as an output feature index of the output feature matrix OFMX_S3.

The neural network device 130 may generate an output feature value by performing an operation on an input feature value and a weight value which correspond to an output feature index. The neural network device 130 may not perform an operation on an input feature value and a weight value which do not correspond to an output feature index.

Figure 14:
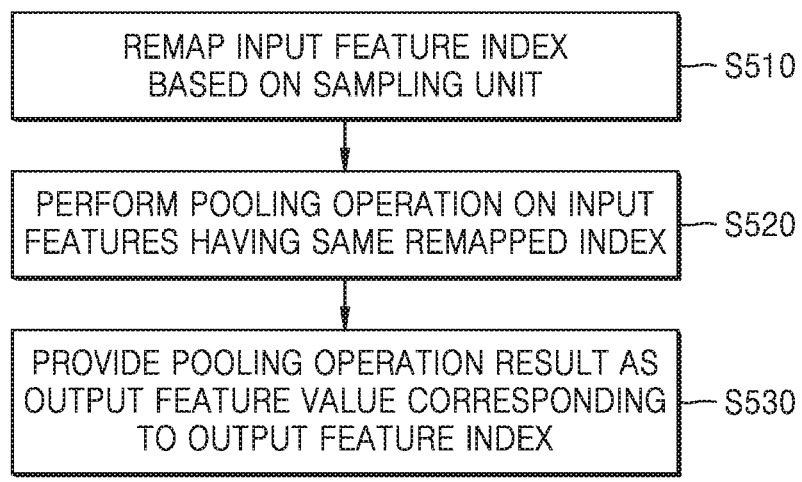
FIG. 14 is a flowchart of an index-based pooling method according to some example embodiments of the inventive concepts.

FIG. 14 is a flowchart of an index-based pooling method according to some example embodiments of the inventive concepts.

Referring to FIG. 14, the neural network device 130 may rewrap input feature indices based on a sampling unit in operation S510. One index may be remapped to a plurality of input features included in a pooling window. The remapped index may be provided as an output feature index of an output feature map.

The neural network device 130 may perform a pooling operation on the input features having the same remapped index in operation S520. In other words, the pooling operation may be performed on the input features included in the pooling window. Max pooling or average pooling may be performed on the input features.

The neural network device 130 may provide a pooling operation value resulting from the pooling operation as an output feature value corresponding to the output feature index in operation S530. The index-based pooling method will be described in detail with reference to FIG. 15.

Figure 15:
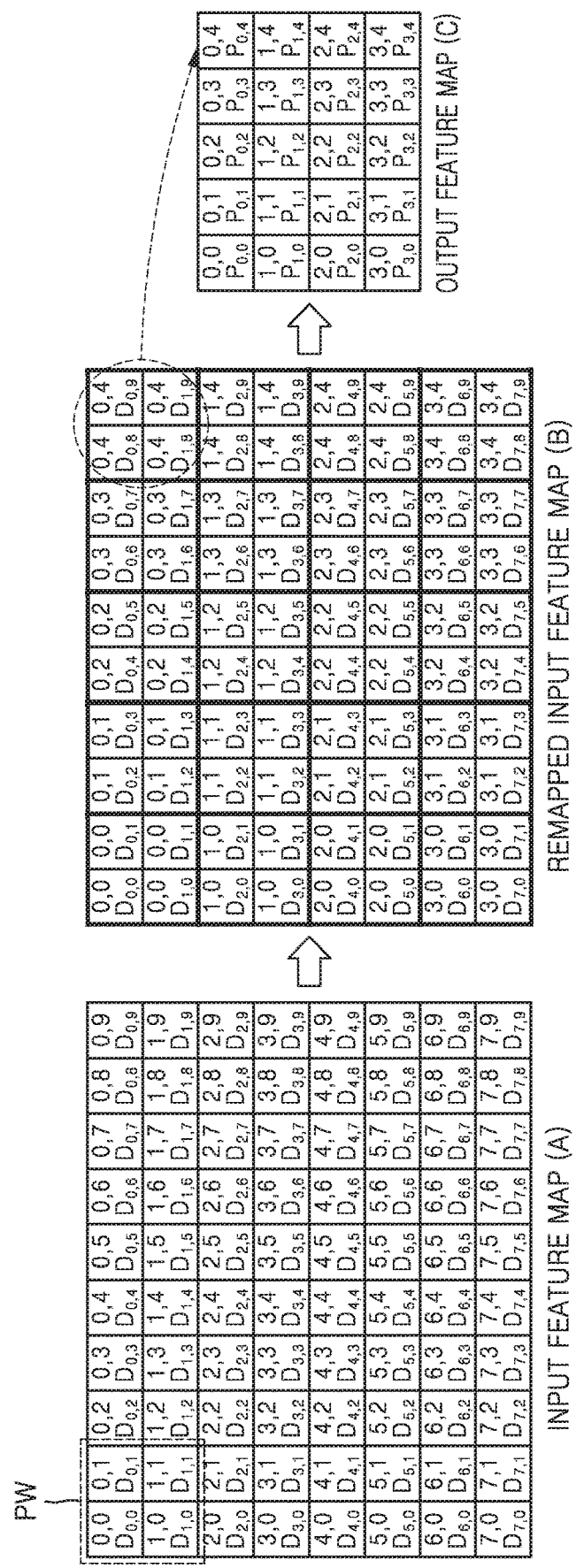
FIG. 15 is a diagram for explaining an index-based pooling operation according to some example embodiments of the inventive concepts.

FIG. 15 is a diagram for explaining an index-based pooling operation according to some example embodiments of the inventive concepts. For convenience's sake in the description, feature maps are represented in matrix form.

As described above with reference to FIG. 2, the size of an input feature map may be reduced at a pooling layer. Accordingly, the parameters and the amount of operations of a neural network may be decreased. As shown in FIG. 15, a 2×2 pooling window PW may be applied to a 10×10 input feature map (a). As a pooling operation is performed on each 2×2 sampling unit, a 5×5 output feature map (c) may be generated. Although 2×2 sampling is shown in FIG. 15, the sampling unit may be variously changed.

According to some example embodiments, the neural network device 130 may perform pooling based on an index. The neural network device 130 may divide an input feature index by a particular (or, alternatively, predetermined) sampling length "sub-sampling size") and may select the quotient of the division as a remapped index with respect to an input (an "output feature index corresponding to an input feature"). Accordingly, as shown in an index-remapped input feature map (b), indices may be remapped with respect to input features and a plurality of input features may have the same remapped index according to a sampling unit. The remapped index may be an output feature index, i.e., a spatial location at which an output feature value will be stored in an output feature matrix. Before input feature values are stored at a location according to the corresponding output feature index, an operation may be performed on the input feature values according to the kind of pooling.

For example, when max pooling is applied to an input feature matrix, a maximum value among input feature values included in a 2×2 sampling unit, i.e., input feature values corresponding to one output feature index, may be provided as an output feature value corresponding to the output feature index.

In another example, when average pooling is applied to an input feature matrix, input feature values corresponding to one output feature index may be added, an added-up value resulting from the addition may be divided by the number of the input feature values, and the division result may be provided as an output feature value corresponding to the output feature index. However, the inventive concepts are not limited to these examples and various kinds of pooling may be used.

When a result of performing a pooling operation on input features corresponding to each output feature index is provided as an output feature value, the output feature map (c) may be generated.

The various embodiments of an index-based neural network operation method have been described above with reference to FIGS. 4 through 15. However, the inventive concepts are not limited to these embodiments. Various operations used in various kinds of neural networks may be performed based on an index.

Figure 16:
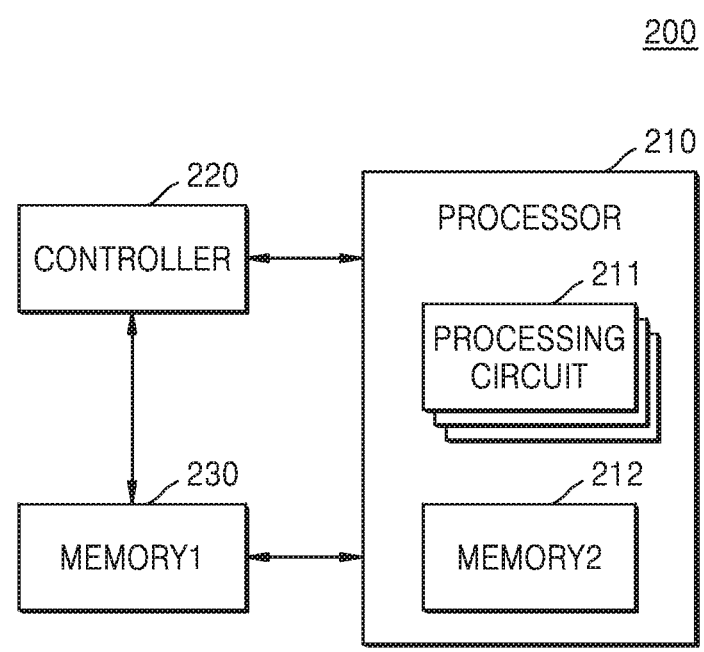
FIG. 16 is a block diagram of a neural network device according to some example embodiments of the inventive concepts.

FIG. 16 is a block diagram of a neural network device 200 according to some example embodiments of the inventive concepts.

Referring to FIG. 16, in some example embodiments the neural network device 200 is the neural network device 130 shown in FIG. 1. Thus the descriptions of the neural network device 130 may be applied to the neural network device 200.

The neural network device 200 may include a controller 220, a neural network processor 210, and a system memory 230. The neural network device 200 may also include a direct memory access (DMA) controller to store data in an external memory. The neural network processor 210, the controller 220, and the system memory 230 of the neural network device 200 may communicate with one another through a system bus. The neural network device 200 may be implemented as a semiconductor chip, e.g., a system-on-chip (SoC), but is not limited thereto. The neural network device 200 may be implemented by a plurality of semiconductor chips. In the present embodiment, the controller 220 and the neural network processor 210 are shown as separate components but are not limited thereto, and the controller 220 may be included in the neural network processor 210.

The controller 220 may be implemented as a CPU or a microprocessor. The controller 220 may control all operations of the neural network device 200. In some example embodiments, the controller 220 may execute a program of instruction stored in the system memory 230 to control the neural network device 200. The controller 220 may control the operations of the neural network processor 210 and the system memory 230. For example, the controller 220 may set and manage parameters to allow the neural network processor 210 to normally execute layers of a neural network.

The controller 220 may generate a weight list from a weight matrix and provide the weight list to the neural network processor 210. However, the inventive concepts are not limited thereto. A separate preprocessing circuit generating the weight list from the weight matrix may be included in the neural network device 200 or the neural network processor 210.

The neural network processor 210 may include a plurality of processing circuits 211. The processing circuits 211 may be configured to simultaneously operate in parallel. Furthermore, the processing circuits 211 may operate independently from one another. Each of the processing circuits 211 may be implemented as a core circuit executing instructions. The processing circuits 211 may perform the index-based operations described above with reference to FIGS. 4 through 15.

The neural network processor 210 may be implemented by hardware circuits. For example, the neural network processor 210 may be implemented as an integrated circuit. The neural network processor 210 may include at least one among a CPU, a multi-core CPU, an array processor, a vector processor, a digital signal processor (IMP), a field-programmable gate array (FPGA), a programmable logic array (PLA), an application specific integrated circuit (ASIC), a programmable logic circuitry, a video processing unit (VPU), and a graphics processing unit (GPU). However, the inventive concepts are not limited thereto.

The neural network processor 210 may also include an internal memory 212. The internal memory 212 may be a cache memory of the neural network processor 210. The internal memory 212 may be SRAM but is not limited thereto. The internal memory 212 may be implemented as a buffer or a cache memory of the neural network processor 210 or one of other kinds of memory of the neural network processor 210. The internal memory 212 may store data generated according to an operation performed by the processing circuits 211, e.g., output feature indices, output feature values, or various kinds of data generated during the operation.

The system memory 230 may be implemented as RAM, e.g., DRAM or SRAM. The system memory 230 may be connected to the neural network processor 210 through a memory controller. The system memory 230 may store various kinds of programs and data. The system memory 230 may store weight maps provided from an external device, e.g., a server or an external memory.

The system memory 230 may buffer weight wraps corresponding to a next layer which will be executed by the neural network processor 210. When an operation is performed using a weight map in the processing circuits 211, the weight map may be output from an external memory (e.g., the memory 140 in FIG. 1) and stored in the internal memory 212 (also referred to herein as a "second memory") of the neural network processor 210 or a dedicated memory included in the processing circuits 211. The weight map may be stored in matrix form, i.e., as a weight matrix or in list form based on an index, i.e., as a weight list. The system memory 230 (also referred to herein as a "first memory") may temporarily store weight maps before the weight maps output from the memory 140 (also referred to herein as an "external memory") are provided to the internal memory 212 or the dedicated memory included in the processing circuits 211.

The system memory 230 may also temporarily store an output feature map output from the neural network processor 210.

Figure 17:
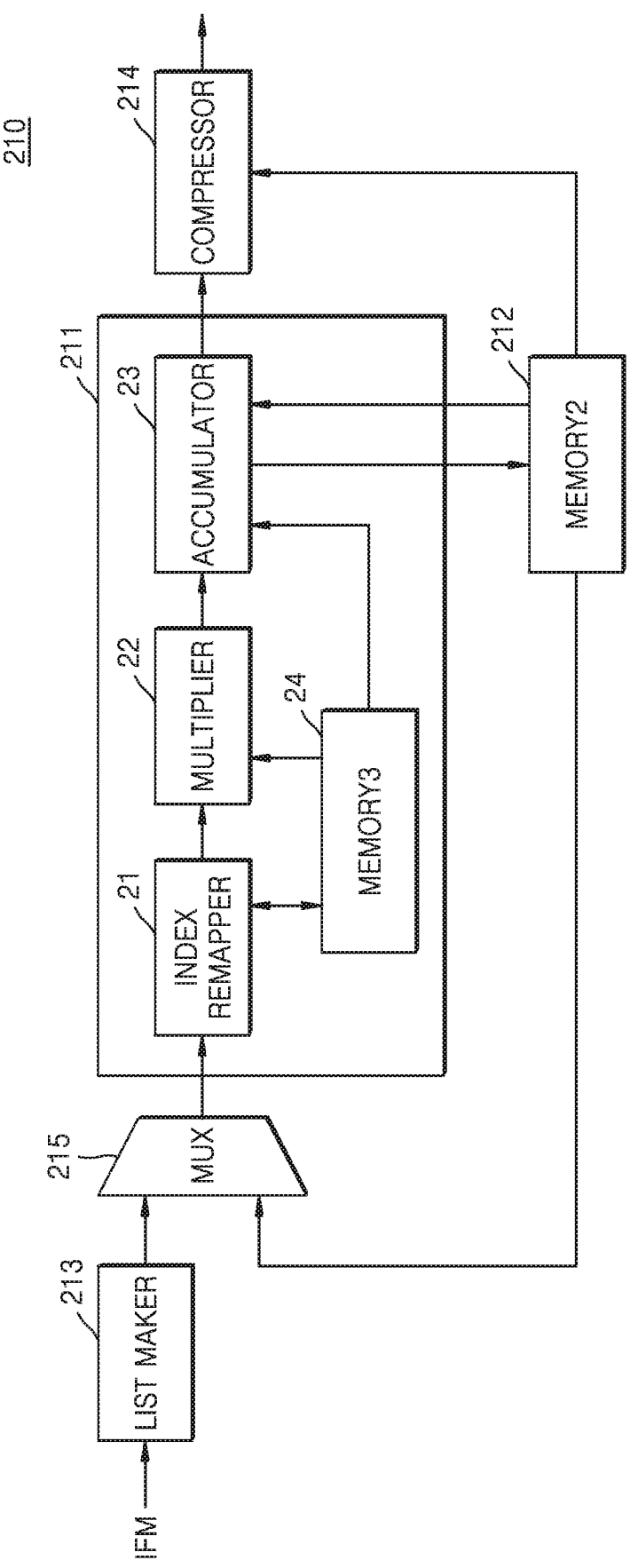
FIG. 17 is a block diagram of a neural network processor according to some example embodiments of the inventive concepts.

FIG. 17 is a block diagram of a neural network processor according to some example embodiments of the inventive concepts. FIG. 17 shows in detail the neural network processor 210 shown in FIG. 16.

Referring to FIG. 17, the neural network processor 210 may include at least one processing circuit 211, a list maker 213, and the internal memory 212 ("second memory"). The neural network processor 210 may also include a compressor 214 and a selector 215. The processing circuit 211 may include an index remapper 21, a first data operation circuit 22 ("multiplier"), a second data operation circuit 23 ("accumulator"), and a dedicated memory 24 ("third memory").

The list maker 213 may generate an input feature list from input features. The list maker 213 may identify inputs having a non-zero value and generate an input feature list of the inputs having a non-zero value.

When a received input feature is a compressed input feature matrix, the list maker 213 may decompress the input feature matrix and generate an input feature list based on the decompressed input feature matrix. When a received input feature includes a compressed input feature list, the list maker 213 may generate an input feature list by performing decompression.

The selector 215 may selectively provide an input feature list output from the list maker 213 or an input feature list received from the internal memory 212 to the processing circuit 211. For example, the selector 215 may provide the input feature list from the list maker 213 to the processing circuit 211 in a first operating mode. The first operating mode may be a linear operation mode. For example, the first operating mode may be a convolution mode. The selector 215 may provide the input feature list from the internal memory 212 to the processing circuit 211 in a second operating mode. The second operating mode may be a pooling mode or a nonlinear operation mode using an activation function. For example, in the second operating mode, a pooling operation may be performed or an activation function may be applied to output feature values generated in the first operating mode.

The index remapper 21 may perform an index operation and generate an output feature index. The index remapper 21 may perform the index operation described above with reference to FIGS. 4 through 15. The index remapper 21 may include an arithmetic operation circuit.

The index remapper 21 may receive an input feature list from the selector 215 and a weight list from the dedicated memory 24. The index remapper 21 may add an input feature index and a weight index to generate an added-up index. The index remapper 21 may divide the added-up index by a particular (or, alternatively, predetermined) integer, e.g., a stride length or a sampling unit, used in the pooling operation.

The index remapper 21 may filter indices which have been generated to allow a data operation to be performed on meaningful indices among the generated indices. For example, the index remapper 21 may classify the generated indices into output feature indices and the other indices so that a data operation is performed on the output feature indices included in an output feature list in the first data operation circuit 22 and/or the second data operation circuit 23. The index remapper 21 may control the first data operation circuit 22 and/or the second data operation circuit 23 not to perform an operation on the other indices.

The index remapper 21 may request that data stored in the dedicated memory 24 be read. For example, the index remapper 21 may request that the dedicated memory 24 read a weight list. Restated, the index remapper 21 may transmit, to the dedicated memory 24, a read request signal associated with a request to read parameters corresponding to a first input feature value among the plurality of parameters in a second operating mode. Alternatively, the index remapper 21 may request that the dedicated memory 24 output parameters corresponding to an input feature value, e.g., an output feature value in the output feature list.

The dedicated memory 24 may store various kinds of data used during an operation performed by the processing circuit 211. For example, the dedicated memory 24 may store a weight list. The dedicated memory 24 may also store a lookup table including parameters corresponding to input feature values. The dedicated memory 24 may provide the weight list to the index remapper 21 and the first data operation circuit 22 in response to a request of the index remapper 21. The dedicated memory 24 may also provide the parameters to the first data operation circuit 22 and the second data operation circuit 23 in response to a request of the index remapper 21.

The first data operation circuit 22 and the second data operation circuit 23 may perform a data operation. The first data operation circuit 22 and the second data operation circuit 23 may form a data operation circuit. The first data operation circuit 22 and the second data operation circuit 23 may perform the data operation described above with reference to FIGS. 4 through 15.

The first data operation circuit 22 may perform a multiplication operation. The first data operation circuit 22 may include a multiplier. When the processing circuit 211 performs a convolution operation, the first data operation circuit 22 may multiply an input feature value in an input feature list by a weight value in a weight list. The multiplication result may be provided to the second data operation circuit 23. The first data operation circuit 22 may be implemented by an array of multipliers.

The second data operation circuit 23 may perform an addition operation and also perform a division operation. Furthermore, the second data operation circuit 23 may perform other various kinds of operations. The second data operation circuit 23 may be implemented as an accumulator or an arithmetic operation circuit. The second data operation circuit 23 may be implemented as an array of operational circuits. For example, the second data operation circuit 23 may be implemented as an array of accumulators.

The internal memory 212 may store data output from the processing circuit 211. For example, the internal memory 212 may store an output feature index and a corresponding output feature value, which are received from the second data operation circuit 23. In other words, the internal memory 212 may store an output feature list. In addition, the internal memory 212 may store intermediate results output from the processing circuit 211 during an operation. The intermediate results may be provided to the second data operation circuit 23 to be used in an operation of the second data operation circuit 23.

Data stored in the internal memory 212 may be provided to the processing circuit 211 through the selector 215. In other words, output data resulting from a current operation of the processing circuit 211 may be used in a next operation. For example, an output feature list generated resulting from a convolution operation of the processing circuit 211 may be provided to the processing circuit 211 as an input feature list and the processing circuit 211 may perform a pooling operation on the input feature list.

Meanwhile, the output feature list may be output from the second data operation circuit 23 to the outside, e.g., the memory 140 of the electronic system 100, or may be stored in the internal memory 212 and then output. The output feature list may be output through the compressor 214. The compressor 214 may compress the output feature list and output a compressed output feature list.

The operation of a processor according to an operating mode will be described with reference to FIGS. 18 and 19 below.

Figure 18:
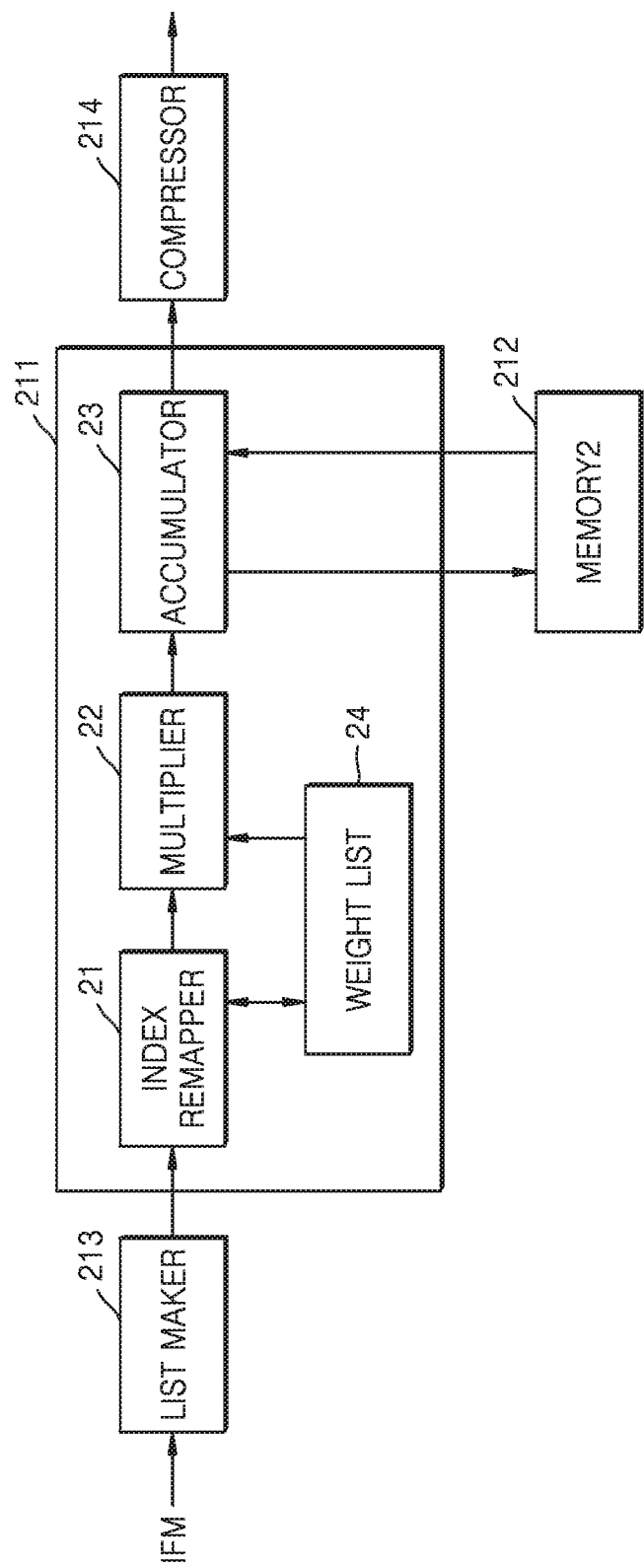
FIG. 18 is a diagram for explaining a state in which a neural network processor operates in a first operating mode according to some example embodiments of the inventive concepts.

FIG. 18 is a diagram for explaining a state in which a neural network processor operates in a first operating mode according to some example embodiments of the inventive concepts. The first operating mode may be a convolution operation mode.

Referring to FIG. 18, the list maker 213 may receive the input feature map IFM and generate an input feature list. The list maker 213 may provide the input feature list to the processing circuit 211.

The index remapper 21 and the first data operation circuit 22 may respectively receive a weight index and a weight value corresponding to the weight index from a weight list stored in the dedicated memory 24. The index remapper 21 may receive the weight index and the first data operation circuit 22 may receive the weight value.

The index remapper 21 may perform an index operation based on art input feature index and the weight index and the first data operation circuit 22 may perform a data operation on an input feature value and the weight value. The index remapper 21 may add the input feature index and the weight index and may also divide the added-up value to generate an output feature index.

The index remapper 21 may also determine whether the output feature index is meaningful. When it is determined that the output feature index is not meaningful, the index remapper 21 may control the first data operation circuit 22 not to perform an operation on the input feature value and the weight value which correspond to the output feature index. Accordingly, the first data operation circuit 22 may perform an operation on an input feature value and a weight value only corresponding to a meaningful output feature index.

The second data operation circuit 23 may add operation results corresponding to the same output feature index among operation results output from the first data operation circuit 22. Consequently, the first data operation circuit 22 and the second data operation circuit 23 may perform a multiplication operation and an addition operation which are included in a convolution operation.

The second data operation circuit 23 may store an output feature list generated through the convolution operation in the internal memory 212 or may output the output feature list through the compressor 214.

Figure 19:
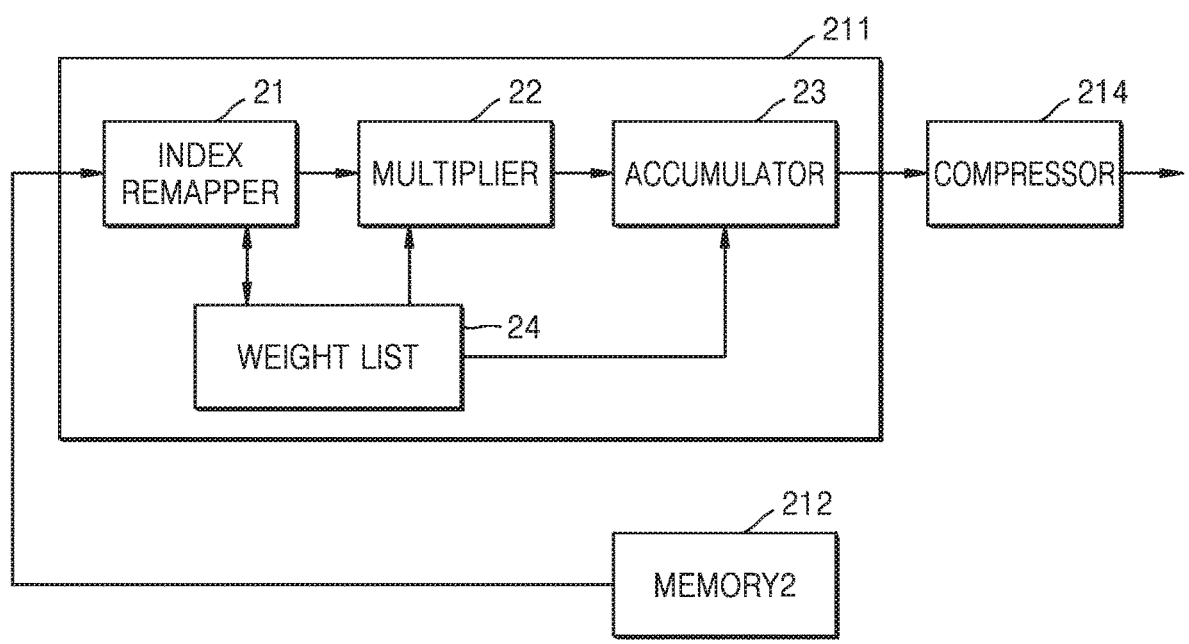
FIG. 19 is a diagram for explaining a state in which a neural network processor operates in a second operating mode according to some example embodiments of the inventive concepts.

FIG. 19 is a diagram for explaining a state in which a neural network processor operates in a second operating mode according to some example embodiments of the inventive concepts. The second operating mode may be performed after a first operating mode. In the second operating mode, an activation function may be applied to output feature values in an output feature list generated in the first operating mode.

Referring to FIG. 19, the result of an operation performed in the first operating mode may be stored in the internal memory 212. For example, the internal memory 212 may store the output feature list, i.e., the result of performing a convolution operation on an input feature list, based on an index.

The index remapper 21 may receive an input feature value, i.e., an output feature value in the output feature list, from the internal memory 212. The dedicated memory 24, which may be referred to herein as a "third memory," may store a lookup table including parameters corresponding to input feature values. Restated, the lookup table may include a plurality of parameters corresponding to each feature value of a plurality of feature values. A sign function, a sigmoid function, or an exponential function may be used in a neural network. These activation functions have nonlinearity. The lookup table may include parameters for allowing an activation function with nonlinearity to be calculated as a piecewise linear function. An output "f" of an activation function of an input feature value "v" may be expressed as a result of applying a piecewise linear function to the input feature value "v", as defined in Equation 1:

$$f = c(v) \cdot v + b(v) \qquad (1)$$

where c(v) is a coefficient corresponding to the input feature value "v" and b(v) is a bias value corresponding to the input feature value "v". The lookup table may include parameters corresponding to different input feature values.

The index remapper 21 may request parameters corresponding to the input feature value "v" from the dedicated memory 24. Such a request may include transmitting, to the dedicated memory 24, a read request signal associated with a request to read parameters corresponding to an input feature value among the plurality of parameters. The received parameters may include a first parameter and a second parameter received from the dedicated memory 24, where the first parameter and the second parameter correspond to the input feature value. Accordingly, the parameters, i.e., c(v) and b(v), corresponding to the input feature value "v" may be output from the lookup table stored in the dedicated memory 24. Restated, the output feature value may be generated based on the input feature value, the first parameter, and the second parameter.

The parameter c(v) may be provided to the first data operation circuit 22 and the parameter b(v) may be provided to the second data operation circuit 23. The first data operation circuit 22 may perform a multiplication operation based on the input feature value "v" and the parameter c(v) and the second data operation circuit 23 may perform an addition operation based on the operation result received from the first data operation circuit 22 and the parameter b(v). As a result, the output "f" of the activation function of the input feature value "v" may be generated. Output feature values of the activation function of a plurality of input feature values may be output to outside the neural network processor. The output feature values of the activation function may be compressed by the compressor 214 before being output to the outside.

Figure 20:
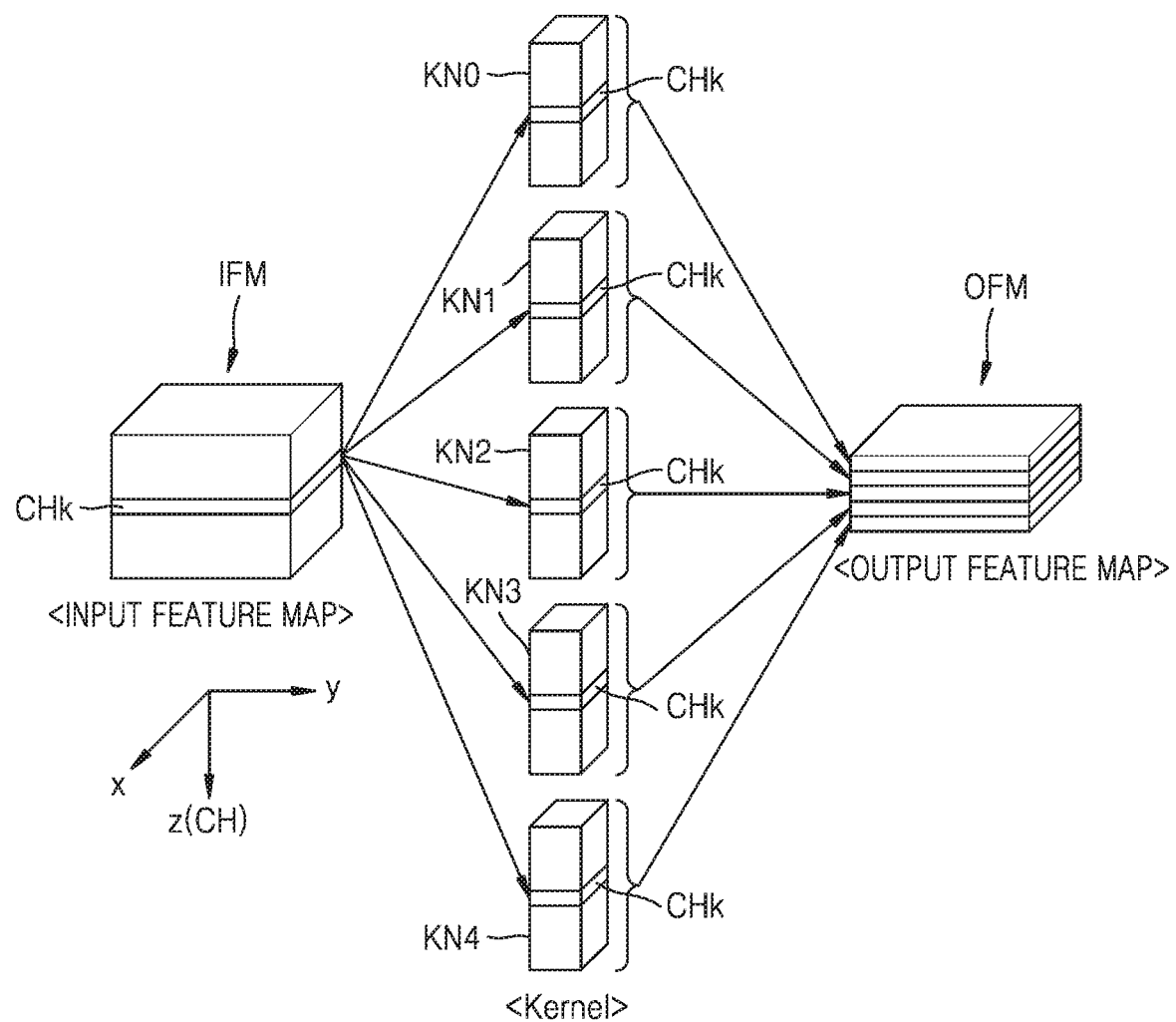
FIG. 20 is a diagram of data flow during a convolution operation according to some example embodiments.

FIG. 20 is a diagram of data flow during a convolution operation in a neural network.

Referring to FIG. 20, the input feature map IFM and an output feature map OFM may have a three-dimensional matrix form. A plurality of kernels KN0 through KN4 having a three-dimensional matrix form may be applied to the input feature map IFM when the convolution operation is performed. As a result, the output feature map OFM may be generated.

The kernels KN0 through KN4 may be filters different from one another to obtain different characteristics from the input feature map IFM. The number of channels CH included in each of the kernels KN0 through KN4 is the same as the number of channels of the input feature map IFM.

When the convolution operation is performed, each of the kernels KN0 through KN4 may be shifted on the x-y plane of the input feature map IFM. Accordingly, the convolution operation may be performed on the input feature map and the kernels KN0 through KN4 channel by channel. For example, a channel CHk of the kernels KN0 through KN4 may be applied to the channel CHk of the input feature map IFM in the convolution operation. When the convolution operation is performed by applying one of the kernels KN0 through KN4 to the input feature map IFM, the convolution operation can be performed independently from channel to channel. Output feature values, which have the same spatial location, e.g., the same location on the x-y plane and correspond to different channels among output features resulting from the convolution operation, may be added. Accordingly, a result of performing the convolution operation by applying one of the kernels KN0 through KN4 to the input feature map IFM may correspond to one channel of the output feature map OFM.

When the convolution operation is performed based on the plurality of the kernels KN0 through KN4, a plurality of channels may be generated. As shown in FIG. 20, when the convolution operation is performed based on the five kernels KN0 through KN4, the output feature map OFM may include five channels.

Convolution operations respectively using the kernels KN0 through KN4 may be performed simultaneously in parallel. The convolution operations may be performed in different processing circuits in parallel. However, this parallel operation may vary with the hardware structure of a neural network.

Figure 21:
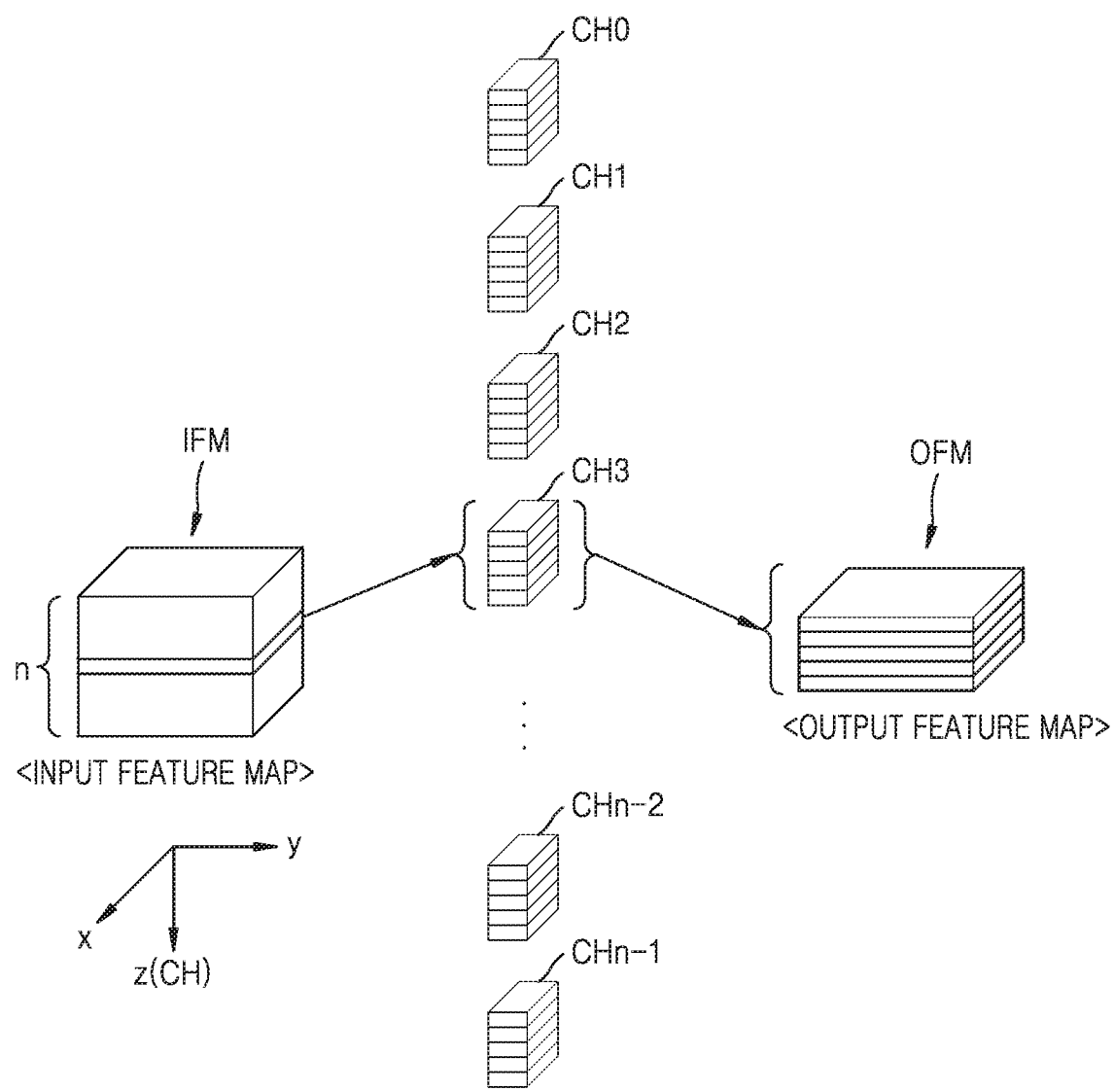
FIG. 21 and FIG. 22 are diagrams of data processing during a convolution operation performed in an index-based neural network, according to some example embodiments of the inventive concepts.
Figure 22:
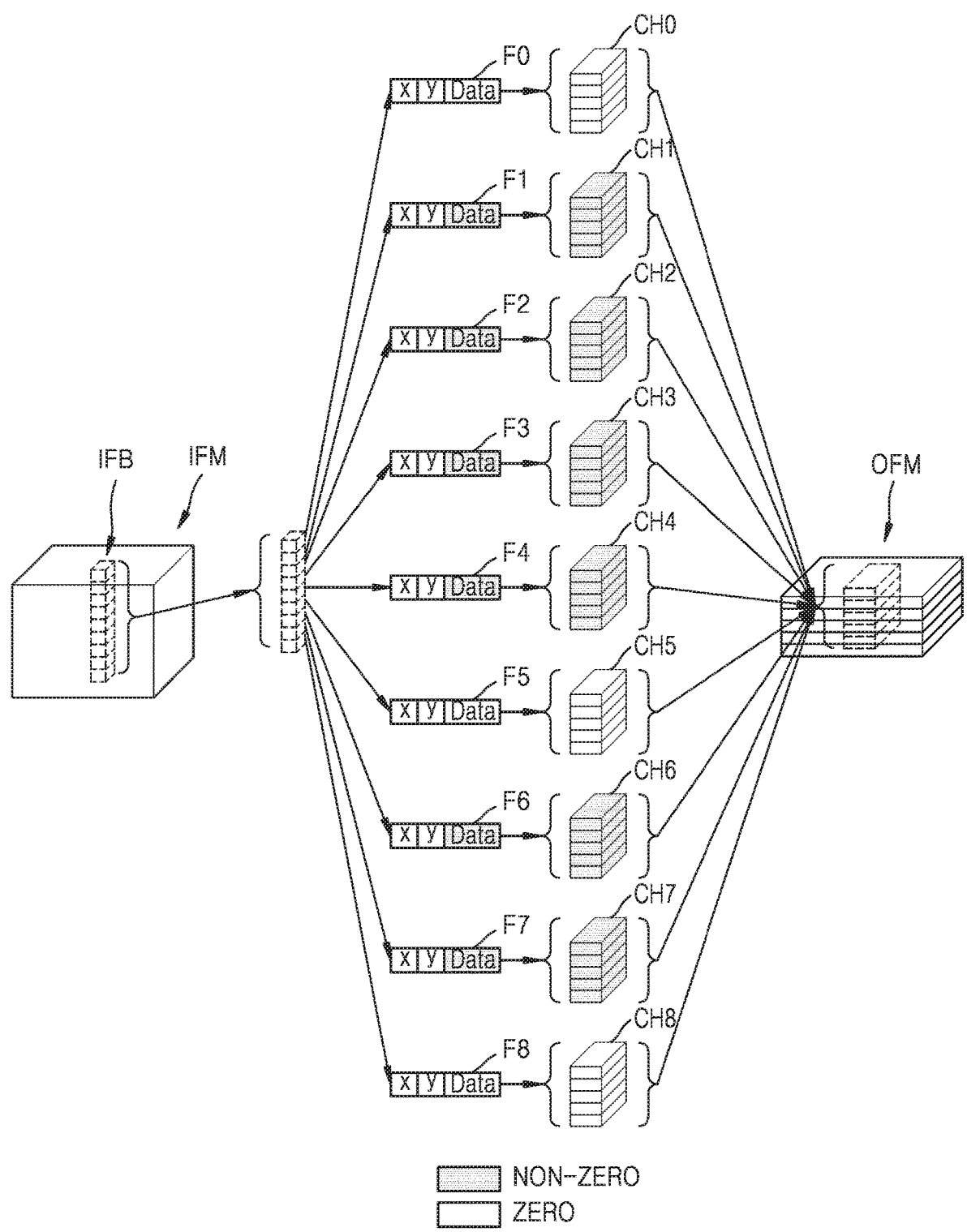

FIGS. 21 and 22 are diagrams of data processing during a convolution operation performed in an index-based neural network, according to some example embodiments of the inventive concepts. FIG. 21 shows data processing allowing an index-based convolution operation to be efficiently performed in a sparse neural network which has sparse non-zero values in an input feature map and a weight feature map.

As described above with reference to FIG. 20, convolution operations based on the kernels KN0 through KN4, respectively, may be simultaneously performed in different processing circuits in parallel. However, according to the current embodiments of the inventive concepts, when convolution operations for respective channels of the input feature map IFM is simultaneously performed in different processing circuits in parallel in the index-based neural network, and in particular, in the sparse neural network, an operation on an input feature having a non-zero value may be performed and an operation on an input feature having the zero value may be skipped. Since input features having a non-zero value have different spatial locations in a plurality of channels of the input feature map IFM, skip of an operation on the zero value may be facilitated by performing operations for the respective channels of the input feature map IFM in different processing circuits.

As described above, to perform convolution operations in parallel in different processing circuits with respect to the respective channels of the input feature map IFM, the index-based neural network may divide each kernel by channels and regroup the same channels of kernels into one channel group.

Referring to FIG. 21, the channels of the first through fifth kernels KN0 through KN4 shown in FIG. 20 may be regrouped. For example, first channels of the kernels KN0 through KN4 may be regrouped into a first channel group CH0 and second channels thereof may be regrouped into a second channel group CH1. In this manner, a plurality of channels of the kernels KN0 through KN4 may be regrouped into different channel groups. Since the number of channels of each kernel is the same as the number "n" of channels of an input feature map, "n" channel groups CH0 through CHn−1 may be generated through the regrouping. Each channel group may be referred to as a core.

When a convolution operation is performed, a channel group corresponding to each channel of the input feature map IFM may be used among the channel groups CH0 through CHn−1. For example, a convolution operation may be performed on a second channel of the input feature map IFM and the second channel group CH1. Each of the channel groups CH0 through includes the channels of the kernels KN0 through KN4, and therefore, the result of a convolution operation based on one of the channel groups CH0 through CHn−1 may influence all first through fifth channels of the output feature map OFM. When among convolution operation results with respect to "n" channel groups, convolution operation results which have been generated from one kernel and correspond to one spatial location on the output feature map OFM are added, the output feature map OFM may be completed.

Referring to FIG. 22, input features IFB located at different channels and having the same spatial location, i.e., the same index may be convolved with different channel groups. Since non-zero values are subjected to an operation in an index-based neural network according to some example embodiments of the inventive concepts, an operation on an input feature having the zero value is not performed. Accordingly, the operations of processing circuits respectively corresponding to a first channel including a first input feature F0 having the zero value, a sixth channel including a sixth input feature F5 having the zero value, and a ninth channel including a ninth input feature F8 having the zero value may be interrupted. However, since the index-based neural network device 200 operates based on indices corresponding to input features having a non-zero value and the input features having a non-zero value are provided to respective processing circuits, the processing circuits may substantially operate until an operation on the input features having a non-zero value is completed in each channel of the input feature map IFM.

Figure 23:
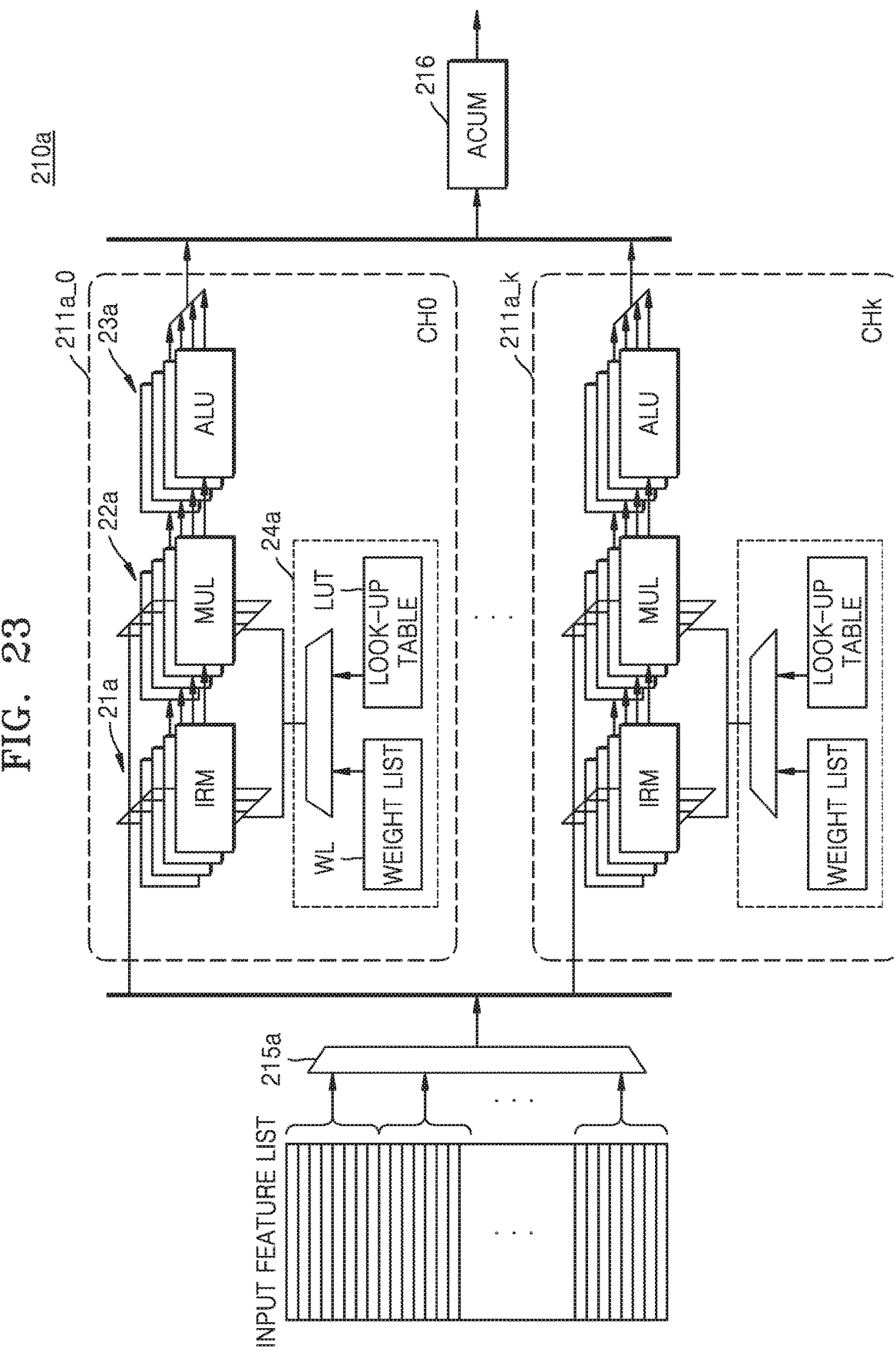
FIG. 23 is a diagram of a neural network processor according to some example embodiments of the inventive concepts.

FIG. 23 is a diagram of a neural network processor 210a according to some example embodiments of the inventive concepts. The neural network processor 210a may have a hardware structure suitable for the sparse neural network operation described with reference to FIGS. 21 and 22 and may perform operations in parallel for respective channels of the input feature map IFM.

Referring to FIG. 23, the neural network processor 210a may include a selector 215a, a plurality of processing circuits 211a_0 through 211a_k, and a global accumulator 216. The neural network processor 210a may also include a list maker and a compressor.

The neural network processor 210a may generate an input feature list for each channel of the input feature map IFM. The selector 215a may provide the input feature list of input features included in each channel to one of the processing circuits 211a_0 through 211a_k. For example, the selector 215a may provide an input feature list of input features included in a first channel to the first processing circuit 211a_0 and may provide an input feature list of input features included in a k-th channel to the k-th processing circuit 211a_k.

The processing circuits 211a_0 through 211a_k may respectively correspond to the channels of the input feature map IFM. In other words, each of the processing circuits 211a_0 through 211a_k may correspond to a core, i.e., one of the channel groups shown in FIGS. 21 and 22. The structure of each of the processing circuits 211a_0 through 211a_k is similar to that of the processing circuit 211 shown in FIG. 17. However, each of the processing circuits 211a_0 through 211a_k may include a plurality of elements corresponding to one element of the processing circuit 211 to perform operations in parallel with respect to a plurality of input features.

For example, the first processing circuit 211a_0 may include a plurality of index remappers 21a, a plurality of first data operation circuits 22a, a plurality of second data operation circuits 23a, and a dedicated memory 24a.

Each of the index remappers 21a may include an arithmetic operation circuit. The first data operation circuits 22a may be an array of multipliers. The second data operation circuits 23a may be an array of adders. However, the inventive concepts are not limited thereto. Each of the second data operation circuits 23a may also include an arithmetic operation circuit.

The dedicated memory 24a may store the weight list WL or a lookup table LUT. When the neural network processor 210a perform a convolution operation, the dedicated memory 24a may output a weight index corresponding to a weight from the weight list WL to the index remappers 21a and may output a weight value corresponding to the weight to the first data operation circuits 22a. The weight list WL may include a weight index, a weight value, and a kernel index which correspond to each weight. The kernel index is information about a kernel including the weight.

When the neural network processor 210a performs a nonlinear operation, the dedicated memory 24a may provide parameters corresponding to an input feature to the first data operation circuits 22a and the second data operation circuits 23a to support a piecewise linear function.

The operation of the first processing circuit 211a_0 is similar to that of the processing circuit 211 described with reference to FIGS. 17 through 19. However, the index remappers 21a may perform index operations in parallel and the first data operation circuits 22a and the second data operation circuits 23a may perform data operations in parallel.

The other processing circuits 211a_1 through 211a_k may substantially include the same elements as the first processing circuit 211a_0 and may perform substantially the same operation as the first processing circuit 211a_0.

Meanwhile, some of operation values output from the respective processing circuits 211a_0 through 211a_k may correspond to the same location on an output feature map. Accordingly, the global accumulator 216 may add operation values which have been output from different processing circuits but correspond to the same location on the output feature map.

At this time, due to the characteristics of a sparse neural network, locations to which operation values output from the processing circuits 211a_0 through 211a_k are mapped on the output feature map may be randomly distributed and locations to which operation values simultaneously output from the processing circuits 211a_0 through 211a_k are mapped may be the same as one another on the output feature map. When the global accumulator 216 accumulates in real time operation values output from the processing circuits 211a_0 through 211a_k, the load of the global accumulator 216 may be excessively increased.

For this reason, the second data operation circuits 23a included in each of the processing circuits 211a_0 through 211a_k may add up operation values output from the first data operation circuits 22a according to spatial locations on the output feature map and channels to generate an added-up value for each spatial location and channel. The processing circuits 211a_0 through 211a_k may be synchronized to output added-up values. Each of the second data operation circuits 23a may include an SRAM bank to add up operation values output from the first data operation circuits 22a according to the spatial locations on the output feature map and the channels.

The added-up values output from the processing circuits 211a_0 through 211a_k may be output as vector data according to a corresponding location on the output feature map. The global accumulator 216 may accumulate the vector data.

Figure 24:
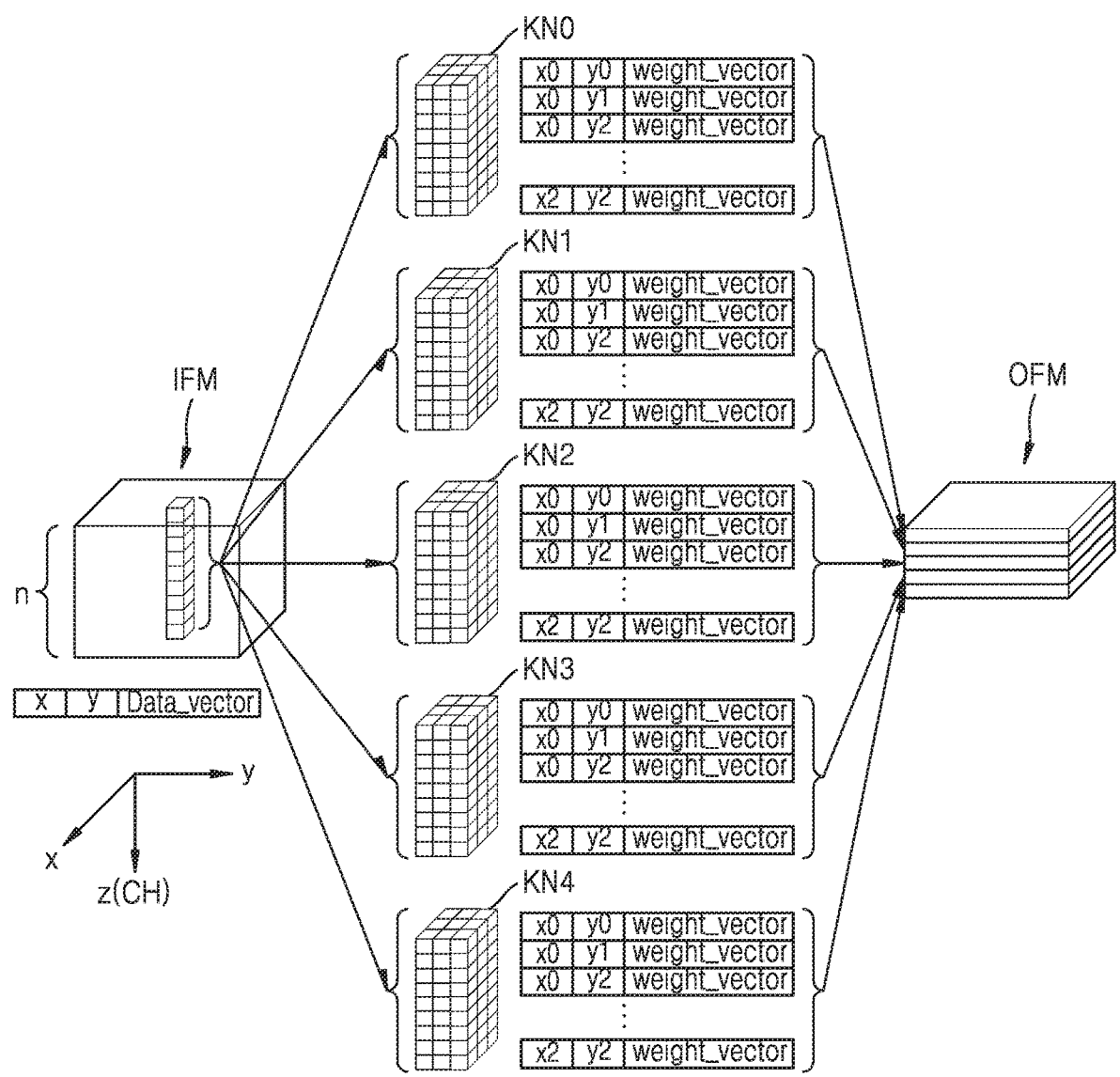
FIG. 24 is a diagram of data processing during a convolution operation performed in an index-based neural network according to some example embodiments of the inventive concepts.

FIG. 24 is a diagram of data processing during a convolution operation performed in an index-based neural network according to some example embodiments of the inventive concepts. FIG. 24 shows data processing allowing an index-based convolution operation to be efficiently performed in a dense neural network having dense non-zero values in an input feature map and a weight feature map.

Since the dense neural network has sparse input features or weights having the zero value, an operation may be efficiently performed by simplifying an operation procedure rather than skipping an operation on the zero value in the operation procedure.

Referring to FIG. 24, the input feature map IFM may be convolved with each of the kernels KN0 through KN4. Convolution operations based on the respective kernels KN0 through KN4 may be performed in parallel in different processing circuits.

As described above with reference to FIG. 20, when a convolution operation is performed on the input feature map IFM and one of the kernels KN0 through KN4, the convolution operation is performed with respect to the same channel. Among operation values resulting from the convolution operation, operation values corresponding to an output feature index indicating one spatial location on the output feature map OFM may be added up. A convolution operation on the input feature map IFM and one kernel may form one channel of the output feature map OFM.

Input features corresponding to an input feature index indicating one spatial location may be expressed by an input feature vector. Weights corresponding to a weight index indicating one spatial location may be expressed by a weight vector. Accordingly, an input feature list may include an input feature index and an input feature vector corresponding to the input feature index and a weight list may include a weight index and a weight vector corresponding to the weight index. For example, each of the kernels KN0 through KN4 shown in FIG. 24 may have nine indices and the weight list may include nine indices and weight vectors corresponding to respective nine indices.

Figure 25:
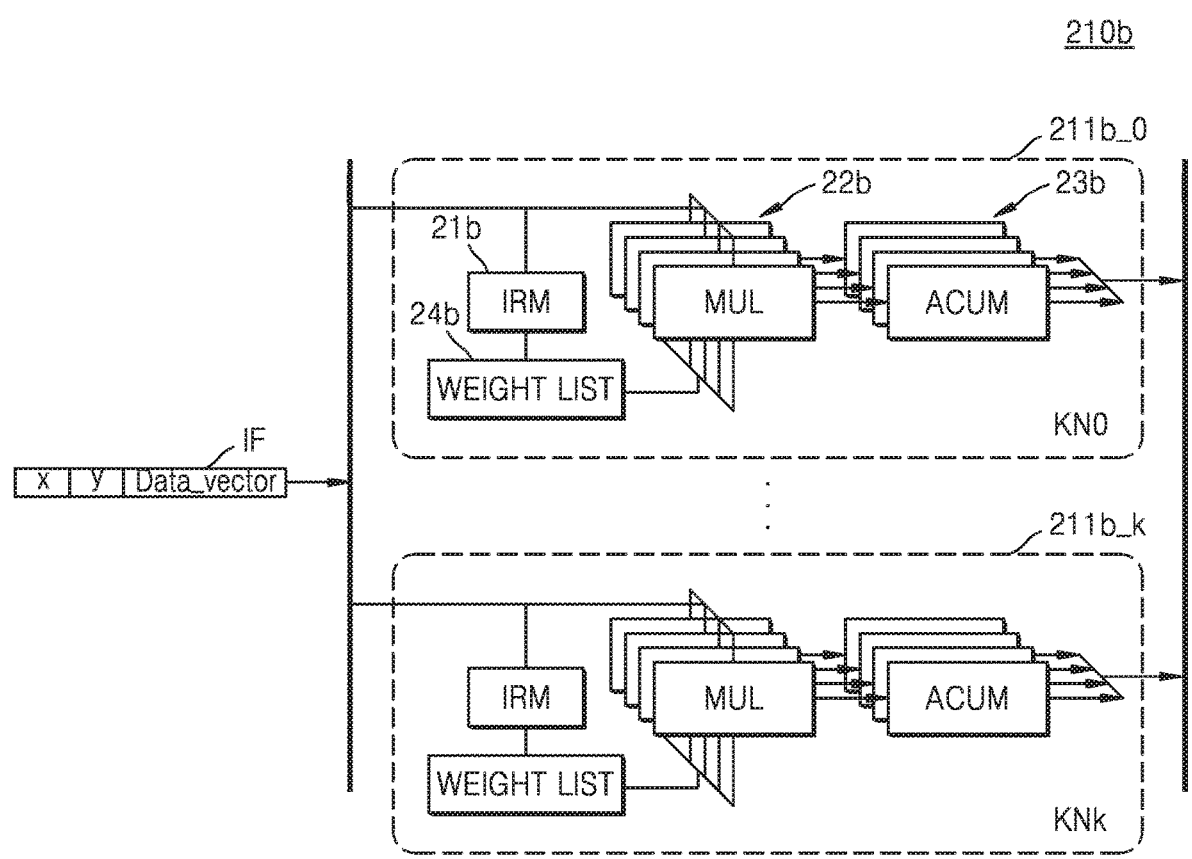
FIG. 25 is a diagram of a neural network processor according to some example embodiments of the inventive concepts.

An input feature index and a weight index are added to generate an output feature index. A dot product of a feature vector and a weight vector may be output as an operation value corresponding to the output feature index. A plurality of operation values may exist with respect to one output feature index. The operation values may be added to generate an output feature value corresponding to the output feature index, FIG. 25 is a diagram of a neural network processor 210b according to some example embodiments of the inventive concepts. The neural network processor 210b shown in FIG. 25 may have a hardware structure suitable for the dense neural network operation described with reference to FIG. 24 and may perform operations in parallel for respective kernels.

Referring to FIG. 25, the neural network processor 210b may include a plurality of processing circuits 211b_0 through 211b_k. The neural network processor 210b may also include an internal memory shared by the processing circuits 211b_0 through 211b_k or a plurality of internal memories supporting the respective processing circuits 211b_0 through 211b_k. The neural network processor 210b may also include a list maker and a compressor.

The processing circuits 211b_0 through 211b_k may respectively correspond to different kernels. The structure of the processing circuits 211b_0 through 211b_k is similar to that of the processing circuit 211 shown in FIG. 17. However, since the processing circuits 211b_0 through 211b_k calculate a vector dot product, each of the processing circuits 211b_0 through 211b_k may include an address remapper 21b, a plurality of first data operation circuits 22b, and a plurality of second data operation circuits 23b. Each of the processing circuits 211b_0 through 211b_k may include a dedicated memory 24b storing a weight list. The weight list may include a weight index and a weight vector corresponding to the weight index.

The address remapper 21b may include an arithmetic operation circuit. The first data operation circuits 22b may be an array of multipliers. The second data operation circuits 23b may be an array of adders. The address remapper 21b may perform an operation on an externally received input feature index and a weight index provided from the dedicated memory 24b, the first data operation circuits 22b may multiply an input feature value by a weight value, and the second data operation circuits 23b may add multiplication values resulting from multiplications. Consequently, a dot product may be performed on an input feature vector corresponding to the input feature index and a weight vector corresponding to the weight index.

While the inventive concepts have been particularly shown and described with reference to embodiments thereof, it will be understood that various changes in form and details may be made therein without departing from the spirit and scope of the following claims.

What is claimed is:

1. A method of operating a neural network device, the method comprising:
    generating an input feature list corresponding to non-zero input features based on an input feature map, the input feature map including a plurality of input features, the plurality of input features including the non-zero input features and zero-value input features, the input feature list including a plurality of input feature indexes and a plurality of input feature values corresponding to the non-zero input features, the plurality of input feature indexes corresponding to separate input features of the non-zero input features, the plurality of input feature values corresponding to separate input features of the non-zero input features;
    generating a plurality of output feature indexes corresponding to non-zero output features based on performing a first operation on each of the plurality of input feature indexes of the input feature list and each of a plurality of weight indexes of a weight list, the weight list including the plurality of weight indexes and a plurality of weight values corresponding to non-zero weights; and
    generating a plurality of output feature values corresponding to the plurality of output feature indexes based on performing a second operation on each of the plurality of input feature values of the input feature list corresponding to the non-zero input features and each of the plurality of weight values of the weight list.

2. The method of claim 1, wherein the weight list includes at least one weight index and at least one weight value, the at least one weight index and the at least one weight value corresponding to at least one weight of a plurality of weights of a weight map, the at least one weight having a non-zero value.

3. The method of claim 1, wherein the generating of the plurality of output feature values includes, for each output feature value, multiplying an input feature value corresponding to one of the non-zero input features by a corresponding weight value of the plurality of weight values.

4. The method of claim 1, wherein the generating of the plurality of output feature values includes, for each output feature value,
    generating a multiplication value based on multiplying an input feature value corresponding to one of the non-zero input features by a corresponding weight value of the plurality of weight values, the multiplication value corresponding to a separate output feature index of the plurality of output feature indexes; and
    generating the output feature value based on adding a plurality of multiplication values, the plurality of multiplication values corresponding to the separate output feature index.

5. The method of claim 1, wherein the first operation includes, for each input feature index, adding the input feature index and a corresponding weight index of the plurality of weight indexes.

6. The method of claim 5, wherein the first operation further includes for each input feature index,
    dividing an added-up value resulting from the adding by an integer; and
    determining whether to select a quotient of the dividing as one of the output feature indexes based on a determination of whether no remainder is present upon completion of the dividing.

7. The method of claim 1, wherein the generating of the input feature list includes
    generating an initial input feature list, the initial input feature list including a plurality of initial input feature indexes corresponding to separate, respective locations of separate, respective input features, the initial input feature list further including the plurality of input feature values corresponding to the plurality of input features, and
    generating the plurality of input feature indexes padded with zeros based on adding a feature bias index to the plurality of initial input feature indexes.

8. The method of claim 1, further comprising generating the weight list from a weight map.

9. The method of claim 8, wherein the generating the weight list includes,
    generating an initial weight list, the initial weight list including an initial weight index corresponding to a location of a weight and a separate weight value of the weight from the weight map, and
    adjusting the initial weight index to correspond to a particular operation.

10. The method of claim 9, wherein the adjusting the initial weight index includes,
    mirroring the initial weight index based on a weight bias index indicating a center of a matrix of the weight map, and
    subtracting the weight bias index from a mirrored weight index.

11. A method of operating a neural network device, the method comprising:
    generating an input feature list based on an input feature map, the input feature map including non-zero input features and zero-value input features, the input feature list including a plurality of input feature indexes and a plurality of input feature values, the plurality of input feature indexes corresponding only to separate non-zero input features and not zero-value input features, the plurality of input feature values corresponding only to separate non-zero input features and not zero-value input features; and performing an index-based operation based on the input feature list, such that the index-based operation is only performed on non-zero input features and is not performed on zero-value input features, the index-based operation including generating a plurality of output feature indexes based on an index operation on the plurality of input feature indexes, and generating a plurality of output feature values corresponding to the plurality of output feature indexes based on a data operation on the plurality of input feature values.

12. The method of claim 11, wherein the generating the plurality of output feature indexes includes adding each of the plurality of input feature indexes and a weight index of a weight list, the weight index corresponding to a weight having a non-zero value.

13. The method of claim 12, wherein the generating the plurality of output feature values includes multiplying each of the plurality of input feature values by a weight value corresponding to the weight index.

14. The method of claim 11, wherein the generating of the plurality of output feature indexes includes, for each input feature index of the plurality of input feature indexes, performing division on the input feature index based on a particular sub-sampling size, and selecting a quotient of the division as one output feature index of the plurality of output feature indexes, the one output feature index corresponding to one input feature of the input feature map.

15. The method of claim 11, wherein generating of the plurality of output feature values includes calculating each output feature value, corresponding to a separate output feature index of the plurality of output feature indexes, as a maximum value among the plurality of input feature values corresponding to the separate output feature index, or an average of the plurality of input feature values.

16. A method comprising:

generating, using a list maker of a processor, an input feature list based on an input feature map, the input feature list including a plurality of input feature indexes and a plurality of input feature values, the plurality of input feature indexes corresponding to separate input features of a plurality of input features, the plurality of input feature values corresponding to separate input features of the plurality of input features;

causing an index remapper of the processor to perform a first operation on each of the input feature indexes to generate one or more output feature indexes, the first operation including separately adding each of the input feature indexes and a weight index of a weight list to generate a plurality of added-up values, dividing each of the added-up values by an integer to generate a plurality of quotients, the plurality of quotients including a first quotient and a second quotient, the first quotient generated based on a first input feature index, the first quotient having no remainder, the second quotient generated based on a second input feature index, the second quotient having a remainder, and selecting the first quotient as being included in the one or more output feature indexes based on a determination that no remainder is present in the first quotient, and selectively excluding the second quotient from the one or more output feature indexes based on a determination that the second quotient has the remainder, such that the second input feature index does not correspond to any output feature indexes; and causing a data operation circuit to perform a second operation on a first input feature value corresponding to the first input feature index and a weight value corresponding to the weight index to generate an output feature value corresponding to a separate output feature index of the one or more output feature indexes, and skip performing the second operation on a second input feature value corresponding to the second input feature index based on the second input feature index not corresponding to any output feature indexes.

17. The method of claim 16, wherein the generating of the output feature value includes, generating a multiplication value based on multiplying the first input feature value by the weight value, the multiplication value corresponding to the separate output feature index; and generating the output feature value based on adding a plurality of multiplication values, the plurality of multiplication values corresponding to the separate output feature index.

* * * * *